United States Patent
Asor

(10) Patent No.: US 12,254,082 B1
(45) Date of Patent: Mar. 18, 2025

(54) USING FIRST-ORDER THEORIES OF BOOLEAN ALGEBRAS TO PROVIDE SAFE ARTIFICIAL INTELLIGENCE (AI) SYSTEMS AND A NOVEL SOFTWARE SPECIFICATION LOGIC

(71) Applicant: IDNI AG, Triesen (LI)

(72) Inventor: Ohad Asor, Triesen (LI)

(73) Assignee: IDNI AG, Triesen (LI)

( * ) Notice: Subject to any disclaimer, the term of this patent is extended or adjusted under 35 U.S.C. 154(b) by 0 days.

(21) Appl. No.: 18/776,245

(22) Filed: Jul. 17, 2024

Related U.S. Application Data

(60) Provisional application No. 63/667,692, filed on Jul. 3, 2024, provisional application No. 63/564,501, filed on Mar. 12, 2024.

(51) Int. Cl.
*G06F 21/52* (2013.01)

(52) U.S. Cl.
CPC .................. *G06F 21/52* (2013.01)

(58) Field of Classification Search
USPC ......................................................... 726/23
See application file for complete search history.

(56) References Cited

U.S. PATENT DOCUMENTS

| | | | | |
|---|---|---|---|---|
| 5,787,432 A | * | 7/1998 | LeTourneau | G06F 9/44 707/999.102 |
| 5,892,947 A | * | 4/1999 | DeLong | G06F 11/3684 717/124 |
| 6,343,376 B1 | | 1/2002 | Saxe et al. | |
| 6,556,978 B1 | * | 4/2003 | Ginsberg | G06F 17/11 706/19 |
| 8,024,177 B2 | | 9/2011 | Lenat et al. | |
| 8,103,674 B2 | | 1/2012 | de Moura et al. | |
| 8,135,663 B2 | | 3/2012 | Abadi | |
| 9,489,221 B2 | | 11/2016 | Bjorner et al. | |
| 2002/0143754 A1 | * | 10/2002 | Paulley | G06F 16/24534 |

(Continued)

OTHER PUBLICATIONS

Kozen, "Rational spaces and set constraints", TAPSOFT '95: Theory and Practice of Software Development, LNCS, vol. 915, Jan. 1, 2005, pp. 42-61 (Year: 2005).*

(Continued)

*Primary Examiner* — Sakinah White Taylor
(74) *Attorney, Agent, or Firm* — SankerIP

(57) ABSTRACT

A method validating commands for a software platform. The platform receives user input to specify a command for the software platform to perform an action. The command is expressed in an extended formal language including elements in a Boolean Algebra. The platform retrieving validation rules for the software platform. The validation rules are expressed in the extended formal language. The platform combines the command and the validation rules to build a formula in the extended formal language, including one or more logical quantifiers. The platform expresses the formula in disjunctive normal form, with an existential innermost quantifier and constructs a new formula in the extended formal language that is logically equivalent to the formula and has no quantifiers. The planform evaluates the truth of the new formula and executes the command to perform the action when the new formula is true. Otherwise, the platform rejects the command.

20 Claims, 4 Drawing Sheets

(56) References Cited

U.S. PATENT DOCUMENTS

| | | | |
|---|---|---|---|
| 2007/0179920 A1* | 8/2007 | Zhang | G06N 5/01 706/19 |
| 2009/0138679 A1* | 5/2009 | Koch, III | G06F 9/30029 712/205 |
| 2009/0164501 A1 | 6/2009 | de Moura et al. | |
| 2009/0248391 A1 | 10/2009 | Abadi | |
| 2010/0299140 A1 | 11/2010 | Witbrock et al. | |
| 2011/0153519 A1* | 6/2011 | Balko | G06Q 10/06 705/348 |
| 2016/0125857 A1* | 5/2016 | Allen | G10H 1/44 84/475 |

OTHER PUBLICATIONS

Jensen "Efficient BDD-Based Planning for Non-Deterministic, Fault-Tolerant, and Adversarial Domains", School of Computer Science Carnegie Mellow University, pp. 1-207, Jun. 2003 (Year: 2003).*

Sato et al."Differentiable learning of matricized DNFs and its application to Boolean networks", Jun. 21, 2023, pp. 2821-2843 (Year: 2023).*

Ying-Ying Tran, "Computably Enumerable Boolean Algebras", Cornell University, pp. 1-49, May 2018 (Year: 2018).*

Herrmann et al, "Algebraic Sentential Decision Diagrams in Symbolic Probabilistic Planning", Brazilian Conference on Intelligent Systems, pp. 175-181, 2013 (Year: 2013).*

Anonymous, "Description Logic—Wikipedia", Dec. 6, 2023, XP093173725, 7 pgs., Retrieved from the Internet: https://web.archive.org/web/20231206040652/https://en.wikipedia.org/wiki/Description_logic.

Anonymous, "Guarded Command Language—Wikipedia", Mar. 16, 2023, XP093173690, 7 pgs., Retrieved from the Internet: https://web.archive.org/web/20230316035612/https://en.wikipedia.org/wiki/Guarded_Command_Language.

IDNI AG, Extended European Search Report, EP Application No. 24152499.0, Jun. 27, 2024, 15 pgs.

Viktor Kuncak et al., "The First-Order Theory of Sets with Cardinality Constraints is Decidable", Computer Science and Artificial Intelligence Laboratory Massachusetts Institute of Technology, Oct. 3, 2004, XP080159646, 18 pgs.

Yifeng Ding et al., "On the Logic of Belief and Propositional Quantification", Journal of Philosophical Logic, Springer Netherlands, vol. 50, No. 5, Apr. 5, 2021, 56 pgs., Retrieved from the Internet: https://link.springer.com/article/10.1007/s10992-021-09595-8.

* cited by examiner

302

$$\phi := \exists var : sort.\phi \mid \phi \wedge \phi \mid \neg \phi \mid bf = 0$$

$$sort := \mathcal{L}_1 \mid \ldots \mid \mathcal{L}_n \mid NSO[\mathcal{L}_1, \ldots, \mathcal{L}_n]$$

$$bf := var \mid \{\phi^{sort}\} \mid 0 \mid 1 \mid bf \wedge bf \mid bf'$$

Figure 3

Software System 100 at a
Computing Device 200

402

Receive a candidate software update. Both the software system and the candidate software update are expressed in an extended formal language that is an extension of one or more base formal languages. Sentences in each base formal language, up to logical equivalence, form elements in a Boolean Algebra, which has a falsity element 0 denoting falsity and and has a truth element 1 denoting truth. The extended formal language includes the first-order theory of Boolean Algebras interpreted in the Boolean Algebra arising from each base formal language, extended to include a plurality of constant symbols, each corresponding to a respective logical equivalence class of sentences in each base formal language. The extended formal language and each base formal language, regarded as Boolean Algebras under logical equivalence, are elementarily equivalent under a signature of Boolean Algebra. The candidate software update corresponds to an update sentence $u$ in the extended formal language.

404

For a condition element $c$, in the extended formal language, specifying a condition to validate the candidate software update, computing a truth value for $uc' = 0$ in the extended formal language, wherein $uc'$ is the logical conjunction of $u$ with the logical negation of $c$.

406

When $uc' = 0$ is false, reject the candidate software update.

408

When $uc' = 0$ is true, accept the candidate software update, and instal the candidate software update on the computing device.

Figure 4

USING FIRST-ORDER THEORIES OF BOOLEAN ALGEBRAS TO PROVIDE SAFE ARTIFICIAL INTELLIGENCE (AI) SYSTEMS AND A NOVEL SOFTWARE SPECIFICATION LOGIC

RELATED APPLICATIONS

This application is a continuation-in-part of European Application No. 24152499.0, filed Jan. 17, 2024, titled "Validation of Computer Software Updates," which is incorporated by reference herein in its entirety.

This application claims priority to U.S. Provisional Application Ser. No. 63/564,501, filed Mar. 12, 2024, titled "Applications of Boolean Algebras," which is incorporated by reference herein in its entirety.

This application claims priority to U.S. Provisional Application Ser. No. 63/667,692, filed Jul. 3, 2024, titled "Utilizing a Novel Temporal Logic with Guarded Successor," which is incorporated by reference herein in its entirety.

TECHNICAL FIELD

The present invention relates to formal languages, and more specifically to the use of Boolean Algebras in the context of formal languages.

BACKGROUND

Designing formal or logical languages with the ability to refer to the truth of their own sentences has been historically problematic in the field of logic. Generally speaking, it is not possible to include statements about truth in a formal language—and about statements in the same language—while keeping the language consistent. This is because the inclusion of such truth reference allows languages to express paradoxes. Perhaps the most widely known result of this nature is Tarski's so-called Undefinability of Truth theorem (Tarski's undefinability theorem-Wikipedia).

This inability to refer to truth in the same formal language is a practical limitation in computing. In particular, one formal language cannot refer to whether another statement in that language is true, or whether one sentence entails the other, as well as similar logical questions that come down to speaking about truth. Known approaches for addressing this issue include so-called paraconsistent and many-valued logics; however, all of the known approaches are of the nature of allowing the languages to contain paradoxes. In this way, the languages are rendered to be so-called nonclassical logics. In those languages, it is therefore no longer the case that every precise statement is either true or false (in a given model if such a setting even has a model theory) in the classical sense.

In computing, the above issue is problematic for performing automatic updates to a computer software system installed on a computing device, and more generally, for the case where a system implemented in a certain language is able to deal with sentences in the same language (where performing a software update is one example of such a situation). In one example, an auto-update feature may download a software update, check that the software update satisfies one or more conditions, and then install the software update only if the one or more conditions are satisfied. As checking the condition is of the form of a logical implication (i.e. 'does the update entail that certain conditions are met?'), then there is currently no formal language that can support implementation of such an auto-update feature while expressing the current software and the software update in the same formal language, as such a language would include a contradiction. Also from a computational implementation point of view, having two languages is unhelpful: either the update-condition itself cannot be updated, or one would need unboundedly many different languages, one per update, entailing even more difficulties.

Also in computing, the above-outlined issue relating to paradoxes in formal languages is relevant to the computational implementation of knowledge representation and reasoning systems (KRRs) or, simply, knowledge systems. KRR is a sub-field of artificial intelligence that focuses on how to represent and manipulate knowledge in a way that allows computers to reason, infer, and make decisions based on that knowledge. KRR has applications in various domains, including expert systems, decision support systems, robotics, semantic web, and more. Common formalisms and languages used in KRR include first-order logic, description logics, semantic networks, and rule-based systems. Once knowledge is represented, KRR systems use various inference mechanisms to derive new information or conclusions from the existing knowledge. These mechanisms include deductive reasoning (using logical rules), inductive reasoning (generalizing from specific examples) and probabilistic reasoning (considering uncertainty and probabilities). Inference engines are the software components responsible for implementing in software these inference mechanisms taking as input the formal knowledge representations, namely, sentences in some formal or logical language(s). In particular, it is desired for these inference engines to be able to determine whether a statement that can be expressed in any given knowledge representation language, is a contradictory statement. Many logical reasoning tasks may be reduced to contradiction detection. For example, to determine whether sentence X entails sentence Y, it is asked whether the sentence "X and not Y" is contradictory. In a case where Y contains free variables, finding all assignments that make the above entailment true amounts to query answering. The abovementioned KRR languages deal with objects and relations between objects. It is of practical necessity to also deal with objects being sentences in the language itself. For example, in "X said Y", Y is also a sentence. However, no known KRR language (or logic in general) can consistently handle statements in its own language, combining them with other sentences, and referring to whether they contain a contradiction, or entail each other, and so on for other logical questions.

It is against this background to which the present invention is set.

SUMMARY

In an aspect of the present invention there is provided a computer-implemented method of validating software updates. The method is performed by a software system or software platform implemented or installed on a computing device having one or more processors and a memory device storing instructions thereon that, when executed by the one or more processors, cause the one or more processors to perform the method described herein.

The method, performed by the software system, comprises receiving a candidate software update for the software system. Both the software system and the candidate software update are expressed in an extended formal language that is an extension of one or more base formal languages. Sentences in each base formal language, up to logical equivalence, form elements in a Boolean Algebra, that has a falsity element 0 denoting falsity and that has a truth element 1 denoting truth. The extended formal language includes the many-sorted first-order theory of Boolean Algebras interpreted in the Boolean Algebra arising from each base formal language, extended to include a plurality of constant symbols each corresponding to a respective logical equivalence class of sentences in each base formal language. The extended formal language and each base formal language, regarded as Boolean Algebras under logical equivalence, are elementarily equivalent under a signature of Boolean Algebra. The candidate software update corresponds to an update sentence u in the extended formal language.

For a condition element c, in the extended formal language, specifying a condition to validate the candidate software update, the method, performed by the software system, comprises computing a truth value for uc'=0 in the extended formal language. Here, uc' is the logical conjunction of u with the logical negation of c. The condition may be regarded as being implied from the software system as a whole. In particular, the condition element c may be recited explicitly in the extended formal language, or it may be implied from the extended formal language describing the software system. The condition may be any suitable condition, e.g. if the new code in the candidate software update implies that private data is sent over a (public) network then the update should be rejected. However, note that the specific content/requirements of the condition is not of relevance to the inventive concept disclosed herein.

In accordance with a determination that uc'=0 is false, the method comprises rejecting the candidate software update. In accordance with a determination that uc'=0 is true, the method comprises accepting the candidate software update, and installing the candidate software update on the computing device. That is, the candidate software update is the updated software of the software system, i.e. the software system determines whether to update itself with the candidate software update.

This aspect of the invention is advantageous in that the software system can autonomously accept or reject updates according to certain conditions, including, updating those very conditions themselves. Existing formal languages would not permit such an update. These advantages are achieved by virtue of the fact that both the software system and the software update (as well as further, subsequent updates) are expressed in the same formal language and that said formal language is classical, and consistent and decidable, even though it refers to its own sentences and their logical relations, what might suspect as impossible due to above Tarski's result. Specifically, this is achievable in the disclosed method by virtue of the fact that sentences in the base logic (base formal language) are abstracted to be seen merely as Boolean algebra elements (or slightly beyond). Here and throughout, the defined extended formal language benefits from being consistent and decidable.

The disclosed method extends to a consideration of a plurality of base formal languages, as defined above.

As is known in the art, in logic and computer science, a formal language is a language with mathematically precise construction rules, such as a programming language. Logic can be considered a formal language in the sense that it provides a framework for expressing and reasoning about propositions and their relationships. In (mathematical) logic, a sentence (or closed formula) is a predicate logic well-formed formula with no free variables. Herein, a sentence is regarded as expressing a set of models in which the sentence holds. It is important to note that we regard Boolean algebras in their full generality, and not only the algebra of binary values.

"Logical equivalence" is a well-defined term in this context. As will be understood by a skilled person, two statements are logically equivalent if they have the same truth value in every model. In model theory, a structure consists of a set along with a collection of functions and relations that are defined on it. "Logical equivalence class" will be similarly well understood by a skilled person (see, e.g., "Equivalence class" on Wikipedia).

It will be understood from the above context that elements of a Boolean Algebra herein are logical sentences up to logical equivalence. This is commonly referred to as Lindenbaum-Tarski Algebra.

References to the first order theory of Boolean Algebra, and to Boolean Algebras that are elementarily equivalent, will be well understood by a skilled person (see, e.g., "List of first-order theories" on Wikipedia). References to many-sorted logic will also be understood (see, e.g., "Many-sorted logic" on Wikipedia). Furthermore, references to a signature of Boolean Algebra will be similarly well understood by a skilled person (see, e.g., "Signature (logic)" on Wikipedia).

The Boolean Algebra of each base formal language may be atomless.

The Boolean Algebras of the extended formal language and each base formal language may be isomorphic or at least elementarily equivalent.

The condition specified by the condition element c may be a combination of different individual conditions each requiring to be satisfied for the candidate software update to be validated and accepted.

The candidate software update may include an update to the condition element c.

If the candidate software update is accepted, then the step of installing the candidate software update on the computing device may include replacing the condition element c with an updated condition element d, in the extended formal language, specifying an updated condition to validate a subsequent candidate software update. (The replacement of the condition c with the condition d is part of the candidate software update.) The updated condition element d may be recited explicitly in the extended formal language, or it may be implied from the extended formal language describing the updated software system.

The method may comprise receiving the subsequent candidate software update for the software system, wherein the subsequent candidate software update is expressed in the extended formal language. Here, the software system may have been updated with the candidate software update. In this way, the software system may be regarded as the updated software system. The method may comprise computing a truth value for ud'=0 in the extended formal language, wherein ud' is the logical conjunction of u with the logical negation of d. In accordance with a determination that ud'=0 is false, the method may comprise rejecting the subsequent candidate software update. In accordance with a determination that ud'=0 is true, the method may comprise accepting the subsequent candidate software update, and may comprise installing the subsequent candidate software update on the computing device.

In some examples, if uc'=0 is false, then the method may comprise identifying a modified software update, that is a modification of the candidate software update. The modified software update may correspond to a logically maximal sentence v, that logically entails the update sentence u, and that satisfies vc'=0, wherein vc' is the logical conjunction of v with the logical negation of c. In such examples, the method may comprise accepting the modified software update, and installing the modified software update on the computing device. In some examples, the modified software update may be accepted only if there is a unique logically maximal sentence that logically entails the update sentence u.

In some examples, prior to the step of computing the truth value for uc'=0 in the extended formal language, the method may comprise modifying the candidate software update to obtain a further candidate software update corresponding to a further update sentence w in the extended formal language. The further update sentence w may be obtained based on a formula in the extended formal language that relates the update sentence u to the further update sentence w. For instance, a modification defined by the software system may be applied to the received candidate software update (e.g., to preserve user preferences or settings as part of an update). In accordance with a determination that wc'=0 is false, the method may comprise rejecting the further candidate software update. In accordance with a determination that wc'=0 is true, the method may comprise accepting the further candidate software update, and installing the further candidate software update on the computing device. In such an example in which the received candidate software update is modified prior to evaluation, the steps involving an evaluation of the received candidate software update (e.g., uc'=0) may be suppressed or may not be performed.

In another aspect of the present invention there is provided a computer software system for validating software updates to the software system. The software system is implemented or installed on a computing device having one or more processors and memory storing one or more programs configured for execution by the one or more processors. The software system is configured to receive a candidate software update for the software system. Both the software system and the candidate software update are expressed in an extended formal language that is an extension of one or more base formal languages. Sentences in each base formal language, up to logical equivalence, form elements in a Boolean Algebra, that has a falsity element 0 denoting falsity and that has a truth element 1 denoting truth. The extended formal language includes the many-sorted first-order theory of Boolean Algebras interpreted in the Boolean Algebra arising from each base formal language, extended to include a plurality of constant symbols each corresponding to a respective logical equivalence class of sentences in each base formal language. The extended formal language and each base formal language, regarded as Boolean Algebras under logical equivalence, are elementarily equivalent under a signature of Boolean Algebra. The candidate software update corresponds to an update sentence u in the extended formal language.

For a condition element c, in the extended formal language, specifying a condition to validate the candidate software update, the software system is configured to compute a truth value for uc'=0 in the extended formal language. Here, uc' is the logical conjunction of u with the logical negation of c.

In accordance with a determination that uc'=0 is false, the software system is configured to reject the candidate software update. In accordance with a determination that uc'=0 is true, the software system is configured to accept the candidate software update, and configured to install the candidate software update on the computing device in order to update the software system.

The condition for update can be more general than uc'=0. In particular, the condition can be any formula in the extended language relating u and c.

In some instances where the condition for update is more general than uc'=0, the condition is expressed as a disjunction of systems of conditions (or any other logically equivalent form), each of the form:

$$uc[1]=0, \ldots, uc[n]=0$$

$$u'd[1]=0, \ldots, u'd[k]=0$$

$$up[1]!=0, \ldots, up[i]!=0$$

$$u'q[1]!=0, \ldots, u'q[j]!=0$$

or equivalent, whether or not c, d, p, and q are single elements or whole formulas, and where the whole condition may or may not contain quantifiers.

One example of a practical knowledge system, or knowledge representation and reasoning system, is a software system that is a function of inputs to outputs at each point over time. In such an example, there are an infinite number of inputs and outputs. A database of all "runs" will all be infinite sequences of inputs and corresponding infinite sequences of outputs. This "infinite" database is not possible to implement computationally (in its entirety) with previous representations of the inputs, outputs, function, and so on. Therefore, it is not possible to analyze and reason over the entire knowledge system. The present invention provides an approach that allows for implementation of the knowledge system on a computer such that it may be determined whether any particular "run" (e.g. a combination of input and output) out of all possible runs, causes a problem. For instance, in an example in which the knowledge system describes a nuclear reactor, is there a run that leads to a serious safety breach of the nuclear reactor.

In accordance with another aspect of the invention there is provided a method of extending a knowledge system to allow or support storing and reasoning over sentences in a same language that the knowledge system supports, the method being performed at a computing device having one or more processors and a memory storing the knowledge system, wherein knowledge in the knowledge system is encoded as sentences in a base formal language. The method comprises storing a plurality of interrelated facts, encoded as knowledge sentences in a base formal language, in the knowledge system, and extending the knowledge sentences to be expressed in an extended formal language that is an extension of the base formal language, wherein sentences in the base formal language, up to logical equivalence, form elements in a Boolean Algebra, that has a falsity element 0 denoting falsity and that has a truth element 1 denoting truth, wherein the extended formal language includes the first-order theory of Boolean Algebras interpreted in the Boolean Algebra arising from the base formal language, extended to include a plurality of constant symbols each corresponding to a respective logical equivalence class of sentences in the extended formal language, wherein the extended formal language and the base formal language, regarded as Boolean Algebras under logical equivalence, are elementarily equivalent under a signature of Boolean Algebra. The method comprises executing one or more queries over the knowledge system in the extended formal language. In some embodiments, the queries are performed using one or more Boolean Algebra methods as described herein. In some embodiments, the method comprises determining outputs to logical questions (e.g., consistency and entailment) related to the knowledge system, in the extended formal language.

In accordance with another aspect of the invention there is provided a method of validating contract provisions, performed at a computing device having one or more processors and memory storing one or more programs configured for execution by the one or more processors.

The method comprises receiving a contract, specified as a plurality of clauses represented by respective clause sentences. The clause sentences are expressed in an extended formal language that is an extension of one or more base formal languages. Sentences in each base formal language, up to logical equivalence, form elements in a Boolean Algebra, that has a falsity element 0 denoting falsity and that has a truth element 1 denoting truth. The extended formal language includes the many-sorted first-order theory of Boolean Algebras interpreted in the Boolean Algebra arising from each base formal language, extended to include a plurality of constant symbols each corresponding to a respective logical equivalence class of sentences in each base formal language. The extended formal language and each base formal language, regarded as Boolean Algebras under logical equivalence, are elementarily equivalent under a signature of Boolean Algebra.

For each combination of two or more elements in the extended formal language, where each combination comprises elements representing respective clause sentences representing respective clauses of the plurality of clauses in the contract, the method comprises evaluating whether an expression corresponding to the logical conjunction of each of the elements in the combination equals 0. For instance, if the combination comprises two elements, namely, a first element x representing a respective first clause sentence representing a first clause of the plurality of clauses in the contract and a second element y representing a respective second clause sentence representing a respective second clause of the plurality of clauses in the contract, then the expression would be xy=0, wherein xy is the logical conjunction of x with the logical conjugation of y. Similarly, if the combination comprises three elements, namely, the first and second elements x, y, and a third element z representing a respective third clause sentence representing a respective third clause of the plurality of clauses in the contract, then the expression would be xyz=0.

In accordance with a determination that there exists a combination of elements satisfying the expression, the method comprises determining that the contract has inconsistent provisions. In accordance with a determination that there is no combination of elements satisfying the expression, the method comprises determining that the contract has consistent provisions.

In accordance with another aspect of the invention there is provided a method of validating commands for an interactive software platform, performed at a computing device having one or more processors and memory storing one or more programs configured for execution by the one or more processors. This is useful, for example, to provide "Safe AI" because the commands are validated against a set of conditions prior to execution. The method comprises receiving user input, at the software platform, to specify a command for the software platform to perform an action. The method comprises retrieving a plurality of defined validation rules for the software platform, where each validation rule, of the plurality of validation rules, is represented by respective validation sentences. The validation sentences are expressed in an extended formal language that is an extension of a base formal language. Sentences in the base formal language, up to logical equivalence, form elements in a Boolean Algebra, which has a falsity element 0 denoting falsity and that has a truth element 1 denoting truth. The extended formal language includes the first-order theory of Boolean Algebras interpreted in the Boolean Algebra arising from the base formal language, extended to include a plurality of constant symbols, each corresponding to a respective logical equivalence class of sentences in the base formal language. The extended formal language and the base formal language, regarded as Boolean Algebras under logical equivalence, are elementarily equivalent under a signature of Boolean Algebra. The method comprises combining the command and the set of defined validation rules for the software platform to build a formula f in the extended formal language, where the formula has one or more logical quantifiers. The method comprises expressing the formula f in disjunctive normal form, with an existential innermost quantifier. The method comprises constructing a new formula g in the extended formal language, where the new formula g (i) is logically equivalent to the formula f and (ii) has no quantifiers. The method comprises evaluating the truth of the new formula g. In accordance with a determination that the new formula g is true, the method comprises performing the command. In accordance with a determination that the new formula g is false, the method comprises rejecting the command.

The command may include one or more further validation rules for the software platform. The one or more further validation rules may update one or more of the defined validation rules.

If the command is performed, the defined validation rules may be updated in accordance with the further validation rules to provide updated validation rules, in the extended formal language, for the interactive software platform.

In some instances, the method comprises receiving subsequent user input, at the software platform, to specify a subsequent command for the software platform to perform a subsequent action. In some embodiments, the method comprises translating the subsequent command into a formula k in the base formal language, where the formula (i) includes one or more logical quantifiers and (ii) is expressed in disjunctive normal form. In some embodiments, the method comprises constructing a new formula (in the extended formal language, wherein the new formula l (i) is logically equivalent to the formula k and (ii) has no quantifiers. In some embodiments, the method comprises evaluating whether the new formula (is consistent with the plurality of updated validation rules for the software platform. In accordance with a determination that the new formula l is consistent with the plurality of updated validation rules for the software platform, the method may perform the subsequent command. In accordance with a determination that the new formula l is not consistent with the plurality of validation rules for the software platform, the method may include rejecting the subsequent command.

In accordance with another aspect of the invention there is provided a non-transitory, computer-readable storage medium storing instructions thereon. When the instructions are executed by one or more processors, the instructions cause the one or more processors to execute any one or more of the methods described above.

In accordance with another aspect of the invention, there is provided a software system, implemented or installed on a computing device, configured to perform the steps of any one or more of the methods described above.

In a general sense, the present invention relates to methods in the field of formal languages and, in particular, the invention provides approaches for solving certain problems expressed in the language of Boolean Algebras (and some of its extensions). The invention provides an approach for extending formal languages with the ability to refer to their own sentences (including in the extended language), determining the truth value of their Boolean combinations, and quantifying over sentences.

BRIEF DESCRIPTION OF THE DRAWINGS

Examples of the invention will now be described with reference to the accompanying drawings, in which:

FIG. 3 provides BNF (Backus Naur Form) productions for the basic syntax of an extended NSO language, in accordance with some embodiments.

FIG. 4 illustrates using disclosed techniques to validate software updates to a software system, in accordance with some embodiments.

DESCRIPTION OF IMPLEMENTATIONS

Figure 1:
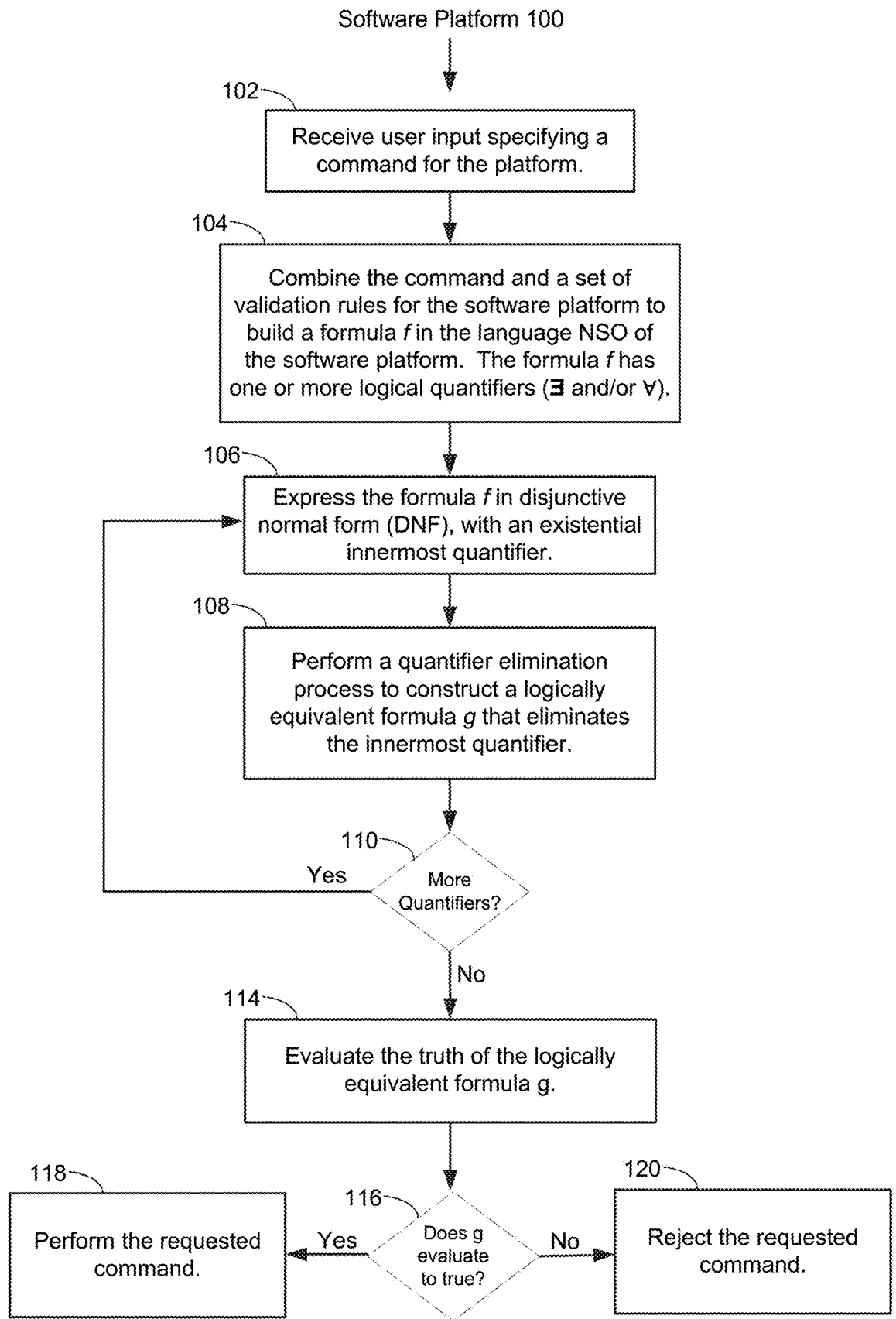
FIG. 1 illustrates using disclosed techniques to validate commands directed to a software platform, in accordance with some embodiments.

FIG. 1 illustrates using disclosed techniques to validate commands directed to a software platform 100, in accordance with some embodiments. The platform 100 receives (102) a user input specifying a command to perform some action. In some instances, the command directs the platform 100 to perform a tangible and/or visible command, such as display something on a screen, send a message to a recipient, perform a calculation, or initiate a workflow. In other instances, the command directs the platform 100 to update itself, such as adding or modifying a validation rule 242.

The platform 100 combines (104) the command and a set of validation rules for the software platform to build a formula f in the language NSO of the software platform. The formula f includes (104) one or more logical quantifiers ($\exists$ or $\forall$).

The platform 100 then expresses (106) the formula f in disjunctive normal form (DNF) with an existential innermost quantifier. In some embodiments, this is achieved by converting the formula to either Prenex Normal Form (PNF, consisting of a prefix and a matrix) or to negated PNF, such that the innermost quantifier is existential, then converting the matrix to DNF. In some embodiments, the process identifies the innermost quantifier. If the innermost quantifier is universal, convert it to an existential quantifier by simple negation. Finally, convert everything under the existential quantifier to DNF.

The system then performs (108) a quantifier elimination process to construct a logically equivalent formula g that eliminates the innermost quantifier. This is described below in sections 5 and 6. For example, when the language NSO is an atomless Boolean Algebra, the techniques of section 5 can be applied. This process eliminates the innermost quantifier. The process checks (110) whether there are additional quantifiers. If so, the process repeats steps 106 and 108 to eliminate the next quantifier (after elimination of an identifier, the resulting formula is generally no longer in disjunctive normal form).

When all of the quantifiers have been eliminated, it is a simple matter to evaluate (114) the truth of the formula g. If the formula g does (116) evaluate to true, the software platform performs (118) the requested command. If the formula g does (116) not evaluate to true, the software platform rejects (120) the requested command.

Typically, the validation rules are for security or safety. For example, the platform may refuse to perform an action that would be harmful to others. As noted above, performing the command may entail updating the compatibility rules themselves.

Figure 2:
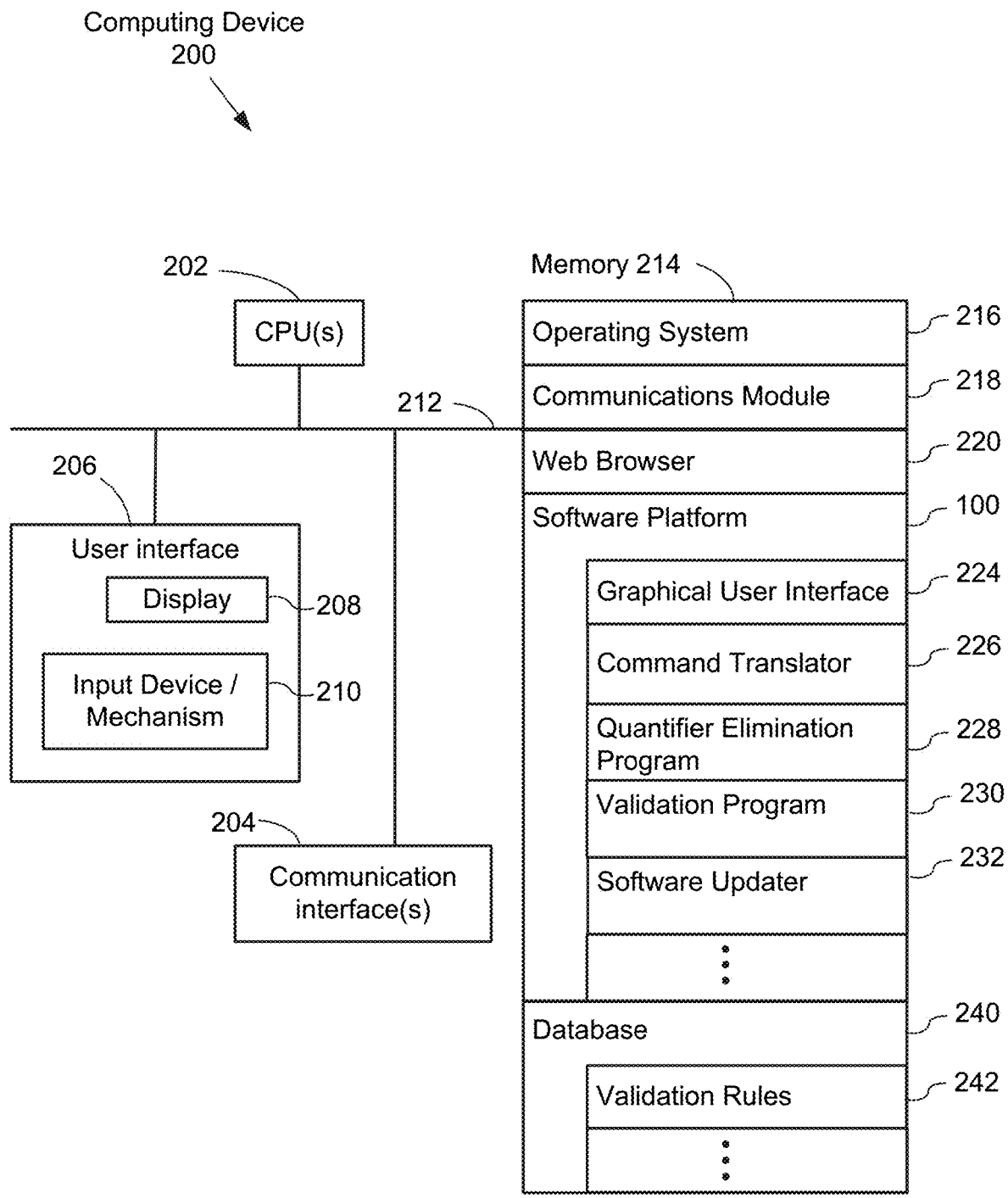
FIG. 2 is a block diagram of a computing device, in accordance with some embodiments.

FIG. 2 is a block diagram illustrating a computing device 200 that can run a software platform 100 to validate and perform commands. In some embodiments, the computing device displays a graphical user interface 224 for the software platform 100. Computing devices 200 include desktop computers, laptop computers, tablet computers, and other computing devices with a display and a processor capable of running the software platform 100. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard. In some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

In some embodiments, the memory 214 includes high-speed random-access memory, such as DRAM, SRAM, DDR RAM or other random-access solid-state memory devices. In some embodiments, the memory 214 includes non-volatile memory, such as one or more magnetic disk storage devices, optical disk storage devices, flash memory devices, or other non-volatile solid-state storage devices. In some embodiments, the memory 214 includes one or more storage devices remotely located from the CPUs 202. The memory 214, or alternatively the non-volatile memory devices within the memory 214, comprises a non-transitory computer-readable storage medium. In some embodiments, the memory 214, or the computer-readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a software platform 100, which may have a graphical user interface 224 for validating and performing commands. In some embodiments, the software platform includes:

a command translator 226, which translates a user command into an internal formal language;

a quantifier elimination program 228, which implements the techniques described in sections 5 and/or 6 below;

a validation program 230, which validates commands against a set of validation rules 242; and a software updater, which updates the software platform when a specified update is consistent with the pre-existing rules; and One or more databases 240, which store data, such as a set of current validation rules 242.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 214 stores a subset of the modules and data structures identified above. In some embodiments, the memory 214 stores additional modules or data structures not described above.

Although FIG. 2 shows a computing device 200, FIG. 2 is intended more as functional description of the various features that may be present rather than as a structural schematic of the embodiments described herein. In practice, and as recognized by those of ordinary skill in the art, items shown separately could be combined and some items could be separated.

FIG. 4 illustrates using disclosed techniques to validate software updates to a software system, in accordance with some embodiments. The method is performed for a software system 100 running on a computing device 200. The software system 100 receives (402) a candidate update, computes (404) a truth value for a specific formula that includes the update, and either rejects (406) or accepts (408) the update based on the computed truth.

In accordance with some embodiments, a method validates software updates as part of an automatic update feature of a software system 100. The method is performed by the software system 100 installed on the computing device 200. FIG. 4 summarizes the steps of the method. A first step 402 of the method involves receiving or downloading a "candidate" software update for the software system 100. Here, both the software system 100 and the candidate software update are expressed in an extended formal language (e.g., NSO), which is an extension of one or more base formal languages. Each base formal language is any suitable formal language. The extended formal language is obtained or defined as described herein. In particular, the base formal language is extended to include a plurality of constant symbols, each corresponding to a respective logical equivalence class of sentences in the base formal language. Here, the extended formal language and each base formal language, regarded as a Boolean Algebra under logical equivalence, is elementarily equivalent under a signature of Boolean Algebra.

In this example, the candidate software update corresponds to an update sentence u in the extended formal language. At the next step 404 of the method, the software system 100 computes a truth value (e.g., 0 or 1) for $uc'=0$ in the extended formal language. That is, the expression $uc'=0$ is evaluated. Here, the condition element c, in the extended formal language, specifies a condition to validate the candidate software update, and $uc'$ is the logical conjunction of u with the logical negation of c.

In the next step 406 of the method, the candidate software update is rejected if $uc'=0$ is determined to be false. On the other hand, if $uc'=0$ is determined to be true, then the method involves, at step 408, accepting the candidate software update, and installing the candidate software update on the computing device 200 (e.g., to update the software system 100).

The present method benefits from supporting or allowing a candidate software update that includes an update to the condition element c that the update must satisfy for it to be acceptable. Indeed, if the update is deemed to be acceptable, and is therefore installed, then the condition element is updated so that subsequent candidate software updates are evaluated against the updated condition to determine if the subsequent update is acceptable for installation.

In some embodiments where the candidate software update is rejected, the method includes determining whether a modified version of the candidate software update can be accepted (and installed). For instance, a candidate software update may include parts (i), (ii), and (iii), and it may be determined that part (iii) contradicts the condition to be satisfied for the candidate software update to be acceptable. Parts (i) and (ii), however, may not contradict the condition. In this case the software system may modify the candidate software update to only include parts (i) and (ii), and instead install this modified version of the software update. In the extended formal language, the modified software update may correspond to a logically maximal sentence v, that is logically entailed by the original update sentence u, and that satisfies $vc'=0$. The sentence $vc'$ is the logical conjunction of v with the logical negation of the condition c. Here, it is noted that a skilled person would understand that logical entailment and logical maximality are well defined in mathematical logic.

The present method benefits from allowing the software system 100 to make modifications or adjustments to a received candidate software update prior to evaluating the update against the conditions to be satisfied. That is, the method may include modifying a received candidate software update to obtain a further candidate software update corresponding to a further update sentence w in the extended formal language. Here, the further update sentence w is obtained based on a suitable formula in the extended formal language that relates the update sentence u to the further update sentence w. The modification may be of any suitable form, and may be for any suitable purpose. The modification can be to narrow or extend the scope of the software update in a particular way, such as attempting to ensure that the (modified) update satisfies the condition in order to permit installation thereof.

The methods disclosed herein may be applied to various problems. In some embodiments, the methods can be implemented computationally to determine whether a contract has clauses that are inconsistent. The disclosed methods are also applicable to software specifications. When undertaking large software development projects, it is crucial to start by writing down a detailed description, or documentation, of the functional and non-functional requirements, constraints, and behaviors of the desired software system. These specifications serve as a blueprint or a contract between stakeholders, such as software developers, designers, project managers, and clients, to ensure that everyone has a clear understanding of what the software is supposed to do and how it should behave. A team of software developers then takes these software specifications (also known as "specs")

and turns them into step-by-step instructions for computers to execute. This is a typical software development process. This last step may be executed by first expressing all the specifications in NSO language specifications. An interpreter is then able to "execute" the specification directly. The obtained specifications are the programs to be executed.

The disclosed methods are also applicable to computer security. One challenge in computer security is often evolving a computer system while preserving its security and integrity. This is very hard to do in a computer system defined using procedural languages, as one would have to consider the possible execution of all the procedures in any order and on a large range of inputs. This is a practically impossible task. In contrast, a software system built on specifications as described above is guaranteed to maintain its security after each alteration or new functionality is added because all system specs and constraints are automatically maintained by the run-time of the disclosed system.

The disclosed methods are also applicable to computer-aided design (CAD) systems. CAD systems are a special case of KRR systems specialized in representing and reasoning on mechanical or electrical engineering designs. In this context, systems often have constraints in terms of required outputs (the performance of the system) while respecting general engineering constraints such maximum stress levels, maximum temperature, electrical currents, and so on. All of these requirements and constraints can be captured and maintained as extended formal language specifications, as described above.

As described above, no previously known knowledge representation and reasoning (KRR) system language (or logic in general) can consistently handle statements in its own language, combining them with other sentences, and referring to whether they contain a contradiction, or entail each other, and so on for other logical questions. The NSO language described herein is the first language capable of doing so, and not only in a consistent way, but even in a decidable way.

The expression "X said Y" might be stated in some language L1, while the expression "Y" might be expressed in a different language L2. In this case, L2 would be less expressive than L1. In fact, L2 is much less expressive because L1 can interpret L2. Next, consider the statement "X said that 'Y said Z'"? This would then need three languages. Following this pattern, it leads to an impractical result, and even impossible to some extent. In the NSO solution described herein, there is provided languages such that L1=L2, and this is achieved by abstracting sentences to merely Boolean Algebra elements (and possibly slightly beyond).

To perform logical tasks in the novel language NSO, novel methods in the field of Boolean Algebra are also described herein. Moreover, NSO is not one language, but a language extension mechanism. The methodology creates infinitely many languages that satisfy this unique and novel property. Moreover, NSO can extend many languages together simultaneously in the same language. Therefore, NSO also provides a novel method of combining logics without breaking their consistency and decidability properties.

1—Background

Automated theorem proving and equation solving is of widespread use in engineering, such as the markets of Formal Methods (e.g., Formal Verification), Knowledge Representation and Reasoning (KRR), Artificial Intelligence (AI), and more. It is useful to find algorithms that allow solving and/or determining the existence of solutions and/or truth values of statements in various formal languages. This application uses the language of Boolean Algebras under some generalized definitions of such a language and presents various methods to solve problems that can be expressed in Boolean Algebras. The techniques can be used in all of the above industries, as well as more.

Decidability of the standard theory of Boolean Algebra was addressed long ago by Tarski. Methods here utilize extensions of the standard theory, including:
 1) Allowing constants to be arbitrary elements and not limited to the values 0 and 1;
 2) Quantification over Boolean Functions, Simple Boolean Functions, and their higher order counterparts;
 3) Cartesian products;
 4) Homomorphisms;
 5) Recurrence relations; and
 6) Converse of binary relations.

The techniques used here also include:
 1) Finding an explicit zero of a Boolean function;
 2) Optimization of Boolean functions with respect to cardinality and the order induced by the Boolean Algebra; and
 3) Quantifier elimination.

2—Terminology, Notation, and Basic Definitions

A Boolean Ring is a ring with unity satisfying $xx=x$ for each element x. A Boolean Function (BF) is a polynomial over a Boolean Ring. If the coefficients of a Boolean Function are only 0 or 1, then it is called a Simple Boolean Function (SBF). A Boolean Algebra is a Boolean ring where the operations are $\wedge$, $\vee$, and '. These operations are interpreted in the language of rings as $x \wedge y \equiv xy$, $x \vee y \equiv x+y+xy$, and $x' \equiv 1+x$. Similarly $x+y \equiv xy' \vee x'y$. Note that the symbol "+" denotes the symmetric difference, which corresponds to an exclusive OR (XOR).

The symbols $\wedge$ and $\vee$ are also used as logical connectives. The usage as operations or logical connectives will be clear from the context. For example, in $x \vee y = 0 \vee y \neq 0$, the first "$\vee$" is a function symbol in the theory of Boolean Algebra and the second "$\vee$" is a logical connective.

The Boolean derivative of a Boolean Function is defined by $\partial f(x)/\partial x \equiv f(0)+f(1)$.

A minterm in n variables, denoted by $X^A$, is a product $x_1^{a_1} x_2^{a_2} \ldots x_n^{a_n}$, where $A \in \{0, 1\}^n$ is a tuple $A=a_1, \ldots, a_n$ and $x_i^{a_i}=x_i'$ when $a_i=1$ and $x_i^{a_i}=x_i'$ when $a_i=0$. It is well known that any Boolean Function can be written as a sum (equivalently, disjunction) of minterms multiplied by respective constant coefficients. As used herein, this is referred to as a "minterm normal form," although some authors refer to this as "canonical DNF." The term "minterm" might be a minterm coupled with a constant coefficient, as should be clear from the context.

The [first order] theory of Boolean Algebra is always considered interpreted in some specific Boolean Algebra, and the language is extended with constant symbols for all Boolean Algebra elements. The interpretation matches each constant symbol to its corresponding Boolean Algebra element. This is different from other common authors on the subject. Commonly, authors consider the first order theory of Boolean Algebras (whether generic or specific or certain classes thereof), where the only constant symbols are 0 and 1. This application deals with a quantified system of equations and inequations. While in other authors' formalisms the atomic formulas are of the form "some Simple Boolean Function equals zero," the present application deals with the more general construct of determining when "some Boolean Function equals zero."

Further the present application considers the many-sorted theory of Boolean Algebras. That is, fix some Boolean Algebras, and obtain the first order theory in which each variable has a type that denotes the Boolean Algebra it should come from (it is also easy to not require explicit typing and interpret the formula mutatis mutandis). Such a theory is interpreted in a product of structures. Variables and constants in a single atomic formula may refer only to one Boolean Algebra, but a combination of atomic formulas from various Boolean Algebras is possible.

As customary, it is possible to define a partial order in Boolean Algebras by defining x≤y if and only if xy=x. An element a is defined to be an atom if 0≤x≤a implies x=0 or x=a, for all x in the Boolean Algebra. A Boolean Algebra is atomless if it has no atoms.

As an example of the above, pick an atomless Boolean Algebra such as the finite unions of left-closed-right-open intervals over the rational numbers. Boolean Functions in this algebra have coefficients that are written in some explicit form, such as [a, b), where a and b are rational numbers. An example of a first order formula (in the disclosed generalized fashion) is ∀x∃y. [1, 2)'x≠[0.1, 6.8)∨y.

It is sometimes useful to refer to Boolean Algebra elements as sets (e.g., when speaking about their cardinality). Such a representation is guaranteed by Stone's Representation Theorem for Boolean Algebras. In fact, an equivalent way to define Boolean Algebras is as a set of sets that are closed under finite unions, finite intersections, and complementation. Every power set is therefore a Boolean Algebra, but there are Boolean algebras that are not power sets. Such latter Boolean Algebras must be infinite.

Just as Boolean Functions can have minterm normal form as above, formulas can also have a similar form. Any atomic formula has the form f(X)=0, so writing f as a disjunction of minterms enables considering only atomic formulas of the form $X^A=0$, since x∨y=0 is same as x=0∧y=0.

3—Method of Finding a Zero of a Formula

Consider a Boolean Function in Boole normal form (sometimes called Shannon's decomposition). This can be written as f(x, X)=xg(X)+x'h(X) or equivalently f(x,X)=xg(X)∨x'h(X), where X is a tuple of n variables. Assuming it has a zero, Boole's consistency condition holds:

$$\left[ \bigwedge_{x \in \{0,1\}} \bigwedge_{X \in \{0,1\}^n} f(x, X) \right] = 0$$

A specific zero is identified inductively as follows. Let Z be a zero of g(Z)h(Z) (which is guaranteed to exist by Boole's consistency condition). Then both f(h(Z),Z)=0 and f(g'(Z),Z)=0. Therefore, one zero can be found inductively by choosing one of those two arbitrarily (or by choosing the shortest case or any other optimization). Finding a single zero enables characterizing all zeros by Lowenheim's General Reproductive Solution.

4—Optimization Methods

Determining whether |f(x)|=n has a solution for some Boolean Function f and finding its minimum and maximum cardinalities (which happen to coincide with minima and maxima induced by the Boolean Algebra) can be performed as follows.

The equation |f(x)|=n has a solution if and only if |f(0)f(1)|≤n≤|f(0)∧f(1)|. More generally, let f(x) be a Boolean Function. Then the minimum of |f(x)| (as well as its minimum with respect to the order induced by the Boolean Algebra, which happens to always exist) is attained precisely when f(0)f'(1)≤x≤f(0)∧f'(1) and the maximum precisely when f'(0)f(1)≤x≤f'(0)∧f(1).

5—Quantifier Elimination Method in Atomless Boolean Algebras

Given a formula in the language of atomless Boolean Algebras, first pick an innermost quantifier and assume it is existential (otherwise, convert it to existential by negation). Consider the corresponding subformula and assume it is in disjunctive normal form (DNF):

$$\exists x. \bigvee_i \left( \bigwedge_j [f_{ij}(x, X) = 0] \wedge \bigwedge_k [g_{ik}(x, X) \neq 0] \right)$$

where each $f_{ij}$ and $g_{ik}$ is a Boolean Function (not necessarily a Simple Boolean Function), interpreted in some fixed atomless Boolean Algebra (it is fixed so that the constants that are not 0 or 1 are correctly interpreted). First, convert it to the form:

$$\exists x. \bigvee_i \left( [f_i(x, X) = 0] \wedge \bigwedge_k [g_{ik}(x, X) \neq 0] \right)$$

(where the f's are not the original ones) by noting that $$\left[ \bigwedge_i h_i(X) = 0 \right] \text{ if and only if } \left[ \bigvee_i h_i(X) \right] = 0$$

for all Boolean Functions $h_i$, as is well known. The resulting formula is logically equivalent to each of the following:

$$\bigvee_i \left[ f_i(0, X)f_i(1, X) = 0 \wedge \bigwedge_k ((g_{ik}(f_i(0, X), X) \vee g_{ik}([f_i(1, X)]', X))) \neq 0 \right]$$

and $$\bigvee_i \left[ f_i(0, X)f_i(1, X) = 0 \wedge \bigwedge_k \left( g_{ik}(0, X)g_{ik}(1, x) \to \frac{\partial [f_i(x, X)]' g_{ik}(x, X)}{\partial x} \right) \neq 0 \right]$$

and $$\bigvee_i \left[ f_i(0, X)f_i(1, X) = 0 \wedge \bigwedge_k (f_i'(0, X)g_{ik}(0, X) \vee f_i'(1, X)g_{ik}(1, X)) \neq 0 \right]$$

6—Quantifier Elimination Method in Boolean Algebras Having Atomic Elements

Existential quantifiers can be eliminated in Boolean Algebras with atomic elements as well. In this case, each element may be written as a (possibly infinite) disjunction of atoms. Powerset algebras are the main example of such algebras. Note that cardinality here coincides with the number of distinct atoms required to construct a given element.

First, as shown above, bring the subformula into the form $$\exists x. \bigvee_i \left( [f_i(x, X) = 0] \wedge \bigwedge_k [g_{ik}(x, X) \neq 0] \right)$$

Then, rewrite this as $$\bigvee_i \left[ [f_i(0, X) f_i(1, X) = 0] \wedge \exists x. \bigwedge_k [g_{ik}(x + f_i(x, X), X) \neq 0] \right]$$

Next, convert this formula to minterm normal form, obtaining a series of inequations of the form $a_1 x \neq 0$, $a_2 x \neq 0$, ..., $a_N x \neq 0$, $b_1 x' \neq 0$, $b_2 x' \neq 0$, ..., $b_K' \neq 0$ by simple conversion into disjunctive normal form (DNF) and noticing that such a conversion does not require negations (only distributing conjunctions and disjunctions over each other), so no inequality is turned into equality. Note that $a_i$ and $b_j$ here are minterms in X, although a more general form is also suitable in this treatment.

The system $a_1 x \neq 0$, $a_2 x \neq 0$, ..., $a_N x \neq 0$, $b_1 x' \neq 0$, $b_2 x' \neq 0$, ... $b_K x' \neq 0$ over any Boolean Algebra has a solution if and only if it has a solution of cardinality at most N (and if K is smaller, then it can have a solution for x'). The method is to therefore convert the formula to one over a finite Boolean Algebra and possibly subsequently to the two-element Boolean Algebra. When a single quantifier ax is to be eliminated, it can therefore be written as log N quantifiers ranging over only 0 and 1, which can in turn be eliminated into disjunctions, therefore yielding a proper quantifier elimination as needed.

Further, let $X^{A_1}, X^{A_2}, X^{A_m}$ be minterms in n variables, and $b_1, b_2, \ldots, b_m$ elements in some Boolean Algebra. A method of determining whether $\exists X. \bigwedge_{i=1}^m [X^{A_i} \geq b_i]$ is to check whether $b_i b_j = 0$ whenever $A_i \neq A_j$. This enables yet another solution method for a system of the form $\exists X. \bigwedge_{i=1}^m [a_i X^{A_i} \neq 0]$ by using Hall's marriage theorem and graph matching algorithms, as it is just determining the existence of a system of disjoint representatives being greater than the $b_i$ values.

7—Cartesian Product Methods

Consider an expression involving $\vee$, $\wedge$, ', x, constants, and variables, where x is interpreted over the sets underlying the Boolean Algebra elements (as guaranteed by Stone's representation theorem for Boolean Algebras, or alternatively over any Boolean Algebra interpreted over fixed sets). Whenever this expression typechecks so that the Cartesian product of one size (e.g., two elements) cannot interact as is with a cartesian product of a different size (e.g., three elements), well-known identities specify that:

$$(ab) \times (cd) = (a \times c)(b \times d)$$

$$(a \times b)' = (a' \times b') \vee (a \times b') \vee (a' \times b)$$

These (or similar identities widespread in literature) push the "x" to the innermost level in the expression. Then, given a first-order formula, the Boolean Function appearing in each atomic formula can be converted to the form of disjunctions of cartesian products of minterms. This formula can be converted to minterm normal form (or a weaker form based on Disjunctive Normal Form for Boolean Functions). Now pulling out "x" over the conjunctions in each clause, the product equals the empty set if and only if at least one multiplicand is empty, which is a disjunction of formulas without the symbol "x".

Note that this allows the Cartesian product of elements from different Boolean Algebras as in the many-sorted theory of Boolean Algebras.

8—Methods for Higher Order Boolean Functions

It is possible to quantify over Boolean Functions, Simple Boolean Functions, and certain Conditional Boolean Functions (as below), and their higher order counterparts, and obtain an equivalent formula without quantification over functions, using the following method. Consider a formula involving existential (or universal, mutatis mutandis) quantification $\exists f$ over such functions. Each Boolean Function of n variables can be written as a Boolean expression involving $2^n$ constants (e.g., by using Boole's normal form, algebraic normal form, or minterm normal form, per subexpression, considering a single variable, or over the whole expression, considering all variables). In this way, quantification over Boolean Functions is converted into $2^n$ first order quantifiers. Similarly, for Simple Boolean Functions, quantify them over constants and require them to be either 0 or 1. A Conditional Boolean Function is a Boolean expression that involves the ceiling function, defined by ceil (0)=0 and ceil (x)=1 for all Boolean Algebra elements $x \neq 0$. Even more generally, a formula in the language of the Boolean Algebra is interpreted as the values 0 or 1 in the Boolean Algebra (which is the same as allowing quantifiers and equality/inequality under the ceiling function). In their full generality, Conditional Boolean Functions may involve unboundedly many coefficients. Restricting them, (e.g., by requiring that expressions under the ceiling function (or in formulas) must be Simple Boolean Functions, or requiring constants to be taken from some fixed finite set), allows quantifier elimination into first order in the same fashion as above.

Higher order functions (Boolean Functions, Simple Boolean Functions, and restricted Conditional Boolean Functions) are seen as operating over the coefficients of their input (possibly higher order) functions and returning coefficients, and are therefore translated accordingly. Therefore, a higher order function that takes a Boolean Function of n variables and returns a Boolean Function of n variables, will be written as a function that takes $2^n$ Boolean Algebra elements and returns $2^n$ elements, with all necessary adjustment for all cases, mutatis mutandis, and similarly for a function that takes a function of functions, and so on.

For efficiency, there is no need to expand the formula exponentially (or a tower of exponentials) right at the beginning, but it can be done step-by-step with opportunities for simplifications and eliminations in each step, in the following fashion. First, a quantifier over a Boolean Function of n variables can be converted to a quantification over two Boolean Algebra elements and over two Boolean Functions over n−1 variables, simply by writing down the Boole normal form (or other form, such as Reed-Muller) for the quantified function with respect to one (possibly cleverly chosen) variable.

9—Method for Homomorphism Quantifier Elimination

The many-sorted theory of Boolean Algebra allows interaction between distinct Boolean Algebras only by means of combining atomic formulas. Even the above Cartesian product that allows mixing different Boolean Algebras still allows a very shallow interaction between them. However, a deeper interaction can be made and is still decidable, using a decision method described now. This is useful not only for interaction between Boolean Algebras, but even as an extension of the theory of a single Boolean Algebra. Further, it trivially has uses (including a decision procedure) in various languages called Description Logics (DLs), which are commonly used in KRR.

It is possible to eliminate quantification over a ring and monoid homomorphisms as long as the quantifier is the innermost quantifier in the formula. A monoid homomorphism is, by definition, a homomorphism that sends conjunctions in one Boolean Algebra to conjunctions in another Boolean Algebra, as well as sending zero to zero. A [Boolean] ring homomorphism is a monoid homomorphism that further sends negation to negation. Further, some circumstances require sending one to one, and may require a homomorphism to be injective and/or surjective. This is possible by suitable treatment of what 0 and 1 are being sent to and from, and recalling that a homomorphism is injective if and only if the only element sent to 0 is 0.

Quantifier elimination of such homomorphisms is done as follows. Given a formula of the form:

$$\exists M_1, \ldots, M_n, \exists H_1, \ldots, H_n$$
$$f(X) = 0 \land \bigwedge_j g_j(X) \neq 0 \land \bigwedge_{(i,j,k) \in I} x_i = M_j(x_k) \land \bigwedge_{(i,j,k) \in J} x_i = H_j(x_k)$$

Here, $X = x_1, x_2, \ldots$ is a tuple of variables, f and $g_j$ are Boolean Functions, the M's are monoid homomorphisms, the H's are ring (Boolean Algebra) homomorphisms, and the order of quantifiers does not matter. First, modify the monoid homomorphisms to ones that distribute over disjunctions rather than conjunctions. In particular, introduce $N_j(x) := M_j'(x')$. Now write each $x_k$ as a disjunction of minterms (or any other disjoint partition), and obtain a system of the form:

$$\exists N_1, \ldots, N_n, \exists H_1, \ldots, H_n$$
$$f(X) = 0 \land \bigwedge_j g_j(X) \neq 0 \land \bigwedge_{(i,j,k) \in I'} x_i = N_j(y_k) \land \bigwedge_{(i,j,k) \in J'} x_i = H_j(y_k)$$

Here, the y's are Boolean combinations of the x's such that $y_i y_j = 0$ whenever $i \neq j$. Note that even though this system looks similar to the original system, it is still very different. For example, if there are only two variables x and y and one equation x=N(y), write y as disjunction of minterms x=N(xy∨x'y), which is same as x=N(xy)∨N(x'y), and finally $x_1 = N(xy)$, $x_2 = N(x'y)$, and $x = x_1 \lor x_2$.

Now replace the equations involving the homomorphisms M and H by saying that M sends zero to zero and interpreting f(X)=0 to mean that certain $y_k$ elements have to equal zero (as can trivially be done if f is in minterm normal form), and H sends zero to zero as well as disjoint y's to disjoint x's. The resulting formula is logically equivalent to the original one while the homomorphism quantifiers are eliminated.

10—Converse Algebras

Consider a special case of Tarski's Calculus of Relations as follows. Consider the powerset algebra of sets of pairs over some domain D. The algebra is P (D×D). Consider the theory of Boolean Algebra of this algebra enhanced with another operation R⁻ taking a binary relation R to its converse (aka inverse or transpose). That is ∀xy. Rxy↔R⁻yx.

Consider two such algebras: general and diagonal-free. Diagonal-free means that no binary relation has a diagonal, namely ∀x.¬Rxx. Complementation is then understood correspondingly, taking the complement but leaving the diagonal yet empty. In the general case $R_d$ denotes the diagonal of R, and $R_{-d}$ is $(R_d)'$ R. A polynomial is any finite combination of elements by means of Boolean operations and converse. Described now is a method to determine whether such a polynomial has a zero.

A converse algebra is defined as "complete" if every diagonal-free relation has a maximal asymmetric part. Every powerset algebra as defined above is complete, and the method extends to other complete converse algebras as well.

Note that a polynomial in R is a Boolean Function of the form f(R, R⁻). Put A=f (1, 1), B=f (1, 0), C=f (0, 1), and D=f (0, 0). Then a method to determine whether ∃R.f(R,R⁻)=0 is to check whether (A∨A⁻) (B∨C⁻) (C∨B⁻) (D∨D⁻)=0, and this for diagonal-free algebras only. In this case any R= A'A⁻∧T is a solution, where T is a maximal asymmetric part of B'C⁻.

For the general case, consider an even more generalized problem of a function that depends also on the diagonal. The general form of such a function is:

$$f(R_d, R, R^-) = AR_d + BRR^- R_d' + CRR^{-'} + DR'R^- + ER'R'$$

A method to determine whether $\exists R.f(R_d, R, R^-) = 0$ is to check whether $A_d E_d = 0$ and $(B \lor B^-)(C \lor D^-)(C^- \lor D) E_{-d} = 0$.

In the notation above, it is useful to have an expression that expresses the intersection of all (possibly infinitely many) R's that satisfy f(R, R⁻)=0 and similarly for f(R_d,R, R⁻)=0. For the first case it is simply (D∨D⁻) (B⁻∨C) and for the second case it is $(D \lor D^-)_{-d} (B^- \lor C) \lor D_d$.

11—Monadic Algebras

Monadic algebras, which are Boolean Algebras extended with an operator ∃ called a quantifier, were studied extensively Jonsson, Tarski, Halmos, and others. Given any such operator that satisfies the axioms of monadic algebras, a necessary and sufficient condition for the existence of a solution for f(x, ∃x)=0, where f is a Boolean function over a monadic algebra, such as ax∃x+bx¬∃x+c(∃x)¬x+d(¬x)(¬∃x)=0 is (∃d)(ac∨∀a)=0, where 12—Logical Languages that Refer to Truth Designing logical languages with the ability to refer to the truth of their own sentences is a long journey in the field of mathematical and philosophical logic. The results in this area are mainly negative: in a certain yet very wide sense, it is impossible to include statements about truth in a language, about statements in the same language, while keeping the language consistent. The inclusion of such truth references allows languages to express paradoxes. Maybe the most well-known result of this nature is Tarski's Undefinability of Truth.

In this age of computing, such an inability becomes a practical limitation. One formal language cannot refer to whether another statement in that language is true, or whether one sentence entails the other, as well as similar logical questions that come down to speaking about truth. Many remedies were proposed in the literature (e.g., paraconsistent and many-valued logics), but they are all of the nature of allowing languages to contain paradoxes, and by that rendering the languages to be so-called "nonclassical logics". In those languages, it is therefore no longer the case that every precise statement is either true or false (in a given model if such a setting even has a model theory) in the classical sense.

It is widely believed, albeit not proved, that classical logics cannot have a truth predicate. This application presents a method to extend virtually any language with the ability to refer to the truth of other sentences, as well as to quantify over its own sentences, while maintaining the original language (here the "base logic") classical and consistent. Even more surprisingly, the construction typically preserves decidability. If the base logic is decidable, so is the extended language. This avoids Tarski's impossibility result by not allowing a syntactic representation of sentences as Tarski requires, but treating them purely semantically, and further allowing only certain operations over them.

Specifically, consider the Lindenbaum-Tarski Algebra (LTA) of some language L. It is the Boolean Algebra (BA) generated by sentences (or formulas) in L, up to logical equivalence. Therefore, it is assumed that L makes a Boolean Algebra. In some embodiments, this Boolean Algebra is further assumed to be atomless. In particular, virtually any language over an infinite signature that makes a Boolean Algebra, makes an atomless one.

The method is as follows: consider the first-order theory of Boolean Algebra interpreted in that Boolean Algebra and extended with a respective constant symbol corresponding to each Boolean Algebra element. In other words, the constants are nothing but formulas in the base logic. The resulting language is trivially consistent and classical, just like the first order theory of any Boolean Algebra. Referring to unsatisfiability and tautology (being the above truth predicates) are simply asking whether a constant or a variable equals zero or one. Further it is possible to quantify over formulas as usual quantification of Boolean Algebra elements.

So far, this creates one language that may speak of another language, but still not about itself. Languages speaking about truth of sentences in other languages is the only known remedy, and it is the widely used common practice for defining and referring to truth (albeit typically not via a Boolean Algebra). However, there are additional steps to elevate this Boolean Algebra construction into a language that speaks about itself.

For that, the first-order theory of the Boolean Algebra can be the LTA of L and have itself an LTA that is elementarily equivalent to the Boolean Algebra of L. A simple case is when the Boolean Algebra is atomless, because all atomless Boolean Algebras are elementarily equivalent (and so are all infinite atomic Boolean Algebras), as demonstrated by Tarski. For that, simply enhance the extended language with infinitely many additional uninterpreted constant, relation, or function symbols. There are many ways, artificial or not, to do so. In an even more extended language (e.g., used for software specification), the atomless property may be obtained by allowing infinitely many input and output streams.

This methodology creates a logic that speaks about the truth of its own sentences as well as quantifying over its own sentences. Further, there are infinitely many such logics, one per choice of base logic. Constants, however, need to be from the extended language. This is described in the construction below.

The section below gives a more precise description of the construction. This considers extending many languages at once, and it is a feature of the construction to allow languages to coexist in a novel method of combining logics.

13—The Language NSO

Fix a set of languages (the "base logics", which need not be related in any way) in which their formulas make a Boolean Algebra. (The formulas are considered up to logical equivalence, in which case it's called the LTA (Lindenbaum-Tarski Algebra) of the language, or by any other equivalence relation of choice.) Then it is possible to consider the many-sorted Boolean Algebra theory of those Boolean Algebras. Constants in that language are formulas in the base logics. Quantification takes the same semantics of quantification over arbitrary Boolean Algebra elements. If the base logics make an atomless Boolean Algebra, then the extended language has decidable satisfiability if and only if the base logics have decidable satisfiability. Otherwise, decidable model counting is required. More precisely, when seen as a Boolean Algebra, it is necessary to know whether an element is a disjunction of at least n distinct atoms.

Denote the extended language by NSO $[L_1, \ldots, L_n]$, where NSO stands for Nullary Second Order (though not under the usual semantics of nullary relations). It is possible to obtain a language that quantifies over its own formulas (quotiented by logical equivalence) as follows. First, NSO $[L_1, \ldots, L_n]$ can already quantify over formulas in $L_1, \ldots, L_n$ in the standard fashion of quantification in a Boolean Algebra. In this setting, each NSO formula is either true or false, because it is interpreted in a fixed model (being the Boolean Algebra that is the LTA of the base logic), and therefore makes a small (only two-element) Boolean Algebra. This is typically still far from being elementarily equivalent to the Boolean Algebra of the base logics. To obtain a richer Boolean Algebra from formulas in NSO $[L_1, \ldots, L_n]$, it can be enhanced with infinitely many relation and/or function symbols, possibly in a decidability preserving fashion (e.g., in the ways mentioned above). Assume NSO $[L_1, \ldots, L_n]$ is properly extended such that it now makes an atomless Boolean Algebra (and other kinds of Boolean Algebras are treated similarly). Constants now may be formulas in NSO $[L_1, \ldots, L_n]$ appearing inside curly brackets in order to avoid syntactic ambiguity. Handling of quantifiers for the sake of a decision procedure can be done by means of the above quantifier elimination decision methods described in sections 5 and 6 above. The basic syntax of NSO $[L_1, \ldots, L_n]$ (before being extended in any way that makes it an atomless Boolean Algebra) can be expressed as a set of three BNF productions, as shown in the box 302 in FIG. 3.

In these productions, $\phi^{\mathcal{L}}$ means any formula in the language L. Each bf may only contain variables and constants from the same sort. The deep-most level of formulas in [nested] curly brackets will be either a formula in $L_1, \ldots, L_n$ or a formula in the language of Boolean Algebra where the only constants appearing in the formula are either 0 or 1. It is then interpreted as a formula over arbitrary atomless Boolean Algebras because they are all elementarily equivalent.

14—Example of Software Update

Suppose a software system has an auto-update feature. It downloads an update, performs certain checks on the new code (the update), and if the checks pass, installs it. It is useful to have the current software and the update written in the same language. Otherwise there is a need for many languages (one for each update). If the checks are of the form of logical implication (e.g., "if the new code implies that private data is sent over the network then reject the update"), then there is a language that speaks about consistency of Boolean combination of sentences in the same language. No previously existing language can support that. But with NSO, it takes the form uc'=0 where u is the update and c is a condition, and the formula is true if and only if u implies c.

15—Extending Languages with Recurrence Relations

In fields that relate to computational logic, such as automated reasoning, automated theorem proving, knowledge representation and reasoning, and formal verification, is it of utmost interest to devise richer formal languages that are still decidable. In particular, it is valuable to have an algorithm that allows determining whether a statement in such languages contains a contradiction. Disclosed techniques show how to enrich a certain class of languages with Recurrence Relations (RR). The enrichment includes forms of recursion and fixed-point operators, while maintaining the algorithmic properties of the original languages, by showing how to convert a statement in the extended language into one in the original language.

The construction here uses the notion of a "weakly ω-categorical theory." In mathematical logic, a "theory" is a set of sentences in a formal language. In many deductive systems there is a set of "axioms" for the theory and other sentences are derived from the axioms by a set of inference rules. A first-order theory is a set of first-order sentences recursively obtained by the inference rules from the set of axioms.

An ω-categorical theory is a first order theory in which all of its countable models are isomorphic. The Ryll-Nardzewski theorem says that this definition is equivalent to another definition. That is, an ω-categorical theory is one in which, up to logical equivalence, there are only finitely many formulas having a fixed number of free variables. This gives rise to defining weakly ω-categorical theories. Weakly ω-categorical theories are those theories where the following set of formulas is finite. The formulas to count are those having a fixed number of variables where all of the constants appearing in them are taken from a fixed finite subset of all constants in the language (up to logical equivalence). Further, even when a theory is not weakly ω-categorical, the language may posses a computable function that reduces each sentence in the language to an equisatisfiable one in some fragment of the original language that is weakly w-categorical. Note that it does not matter whether the language is interpreted in a certain model.

Any ω-categorical theory is a weakly ω-categorical theory, but not vice versa. For example, theories of atomless Boolean Algebras (thanks to their quantifier elimination properties described above), with atomic formulas being Boolean Functions and not merely Simple Boolean Functions, are weakly ω-categorical but not ω-categorical, because the constants may be interpreted in infinitely many ways. If atomic formulas were limited to Simple Boolean Formulas only, the theory would be ω-categorical (and there is no further distinction regarding which atomless Boolean Algebra is chosen since they are all elementarily equivalent according to Tarski).

Consider a system of named formulas with (potentially mutual) recurrence relations, such as $\phi_n(x, y) = \exists z. \psi_{n-1}(x, z) \wedge \phi_{n-1}(z, y) \vee \phi_{n-2}(z, x)$ and with initial conditions $\phi_1(x, y) = \ldots \phi_2(x,y) = \ldots, \psi_1(x, y) = \ldots$. There are additional (possibly named) formulas referring to $\phi$ under the intended meaning that $\phi$ is actually $\phi_\infty$, which is the fixed point of $\phi$ (or more general notions as described below). The recursion can be unfolded (e.g. bottom-up, with or without normalization) and get a possibly infinite formula. If the theory is weakly ω-categorical, then the unfolding process will encounter only finitely many formulas up to logical equivalence, so it will start repeating at some point. If N is the point where it starts repeating, then for any K>N, it is easy to determine what the recurrence relation will unfold into (up to logical equivalence) after K steps. Further, when there is a fixed point, $\phi_N = \phi_K$ for all K>N. In this case, the recurrence relation is equivalent to just φN. Therefore, any weakly ω-categorical theory can be extended with recurrence relations and any formula in the extended language can be converted into a logically equivalent formula in the original language because the relevant logical equivalence problem is decidable for that language.

In practice, some details have to be considered. For example, the details include the case where there is no fixed point. While unfolding the recursion, it is guaranteed to reach a formula that was previously encountered, but not necessarily the immediately previous formula. In this case, there is no fixed point. This can be handled in several ways. One option is to treat the expression as evaluating to false. A second option is to extend the language to have a "fallback" formula that is used when there is no fixed point. A third option is to return the formula for which the loop occurs (e.g., the first repeated formula). These and other similar simple remedies are typically reducible to the original language.

16—GSSOTC: A Novel Temporal Logic

In fields that relate to computational logic, such as automated reasoning, automated theorem proving, knowledge representation and reasoning, and formal verification, is it very useful to devise richer formal languages that are still decidable. In particular, it is valuable to have an algorithm that allows determining whether a statement in such languages contains a contradiction. In many logical languages it is important to have a temporal aspect. For example, in software and process specification languages, it is important to be able to express statements of the form "first do this and then do that." Moreover, in many cases it is very important to distinguish between inputs and outputs.

Many temporal logics exist from the early days of computer science and computational logic. One of their main limitations is that they commonly become undecidable when the number of possible states is not finite or not bounded. In addition, many temporal logics have a limited ability to distinguish between inputs and outputs, if at all. Overcoming the decidability issue is a major active area of research, sometimes referred to as temporal logics over infinite data values. The data elements are commonly equipped with only very simple operations, typically limited to checking for equality. Further, these logics and other similar machineries are typically not closed under Boolean combinations.

Disclosed here is a new, decidable, family of temporal logics over infinite data values, where those values come with theories much richer than merely equality. And some embodiments are equipped with the theory of Boolean Algebras. Further this language enjoys the distinctive ability to verify statements of the form "for all inputs there exist a well-defined output." Moreover, this logic extends beyond merely a temporal logic. It is a highly expressive language and is also decidable.

In what follows, L denotes an arbitrary logic (potentially with additional conditions specified), and D denotes its domain of discourse (i.e., D is the set of elements over which the first-order quantifiers range). For each formula there may be many interpretations, each with a different domain D.

Given a language L, it can be extended in the following way into the language denoted by GS[L], where GS stands for "Guarded Successor." This will further be extended to the language GSSOTC[L], standing for "Guarded Successor Second Order Time Compatible." Decision procedures are then described for that language.

17—The Language GS

A formula with ordered free variables may be seen as defining functions between sequences (and more generally, between trees), which comes into full play in the language GSSOTC (below). First consider the language GS(L) describing sequences and trees without including functions between them. For simplicity, consider the case of sequences. (The case for trees is completely analogous by considering more than one successor relation.) A formula with two free variables $\phi(x, y)$ may be seen as defining a set of all sequences for which any two consecutive elements x, y satisfy $\phi(x, y)$. More formally, if $S=s_1, s_2, \ldots$ is a sequence, then S models $\phi(x, y)$ (written as $S \vDash \phi(x, y)$) iff $\wedge_{n=1}^{|S|-1}(s_n, s_{n+1})$, where |S| is the (possibly infinite) length of S. Any definition of sequences by means of free variables in this fashion is equivalent to a definition by means of guarded successor predicate, and vice versa (except for addressing constant positions and the end of the string). The successor relation s (n, k) over the set of natural numbers simply means that n=k+1. The above formula may therefore be written as $\forall nk \cdot s(n, k) \rightarrow \phi(f(n), f(k))$, where the symbol f is a function symbol of type $\mathbb{N} \rightarrow D$, where the structure $\mathbb{N}$ is equipped solely with the successor relation. In this formula the successor relation appears as a "guard" (in the terminology of what is called the "guarded fragment" of first order logic). It is also possible to write $\forall mnk. (s(m, k) \wedge s(k,n)) \rightarrow \phi(f(m), f(n), f(k))$, where $\phi$ defines sequences in which each three consecutive elements satisfy a certain formula ø. Strictly speaking, this formula is not in the guarded fragment.

Guarded successor logic is therefore defined as follows: the successor relation may appear only in guards, and in a way that uniquely determines the distance between each of the variables. In this formulation, each guarded successor formula is equivalent to a formula of the form $\phi(f(n), f(n-1), f(n-2), \ldots )$, and therefore is equivalent to specifying sequences by means of ordered free variables.

The above description used only a universal quantifier over the sort of natural numbers. To handle arbitrary quantification, it is possible to collapse quantifier alternations. The guarded formula $\forall n \exists k \cdot s(n, k) \wedge \phi(f(n), f(k))$ is (due to the uniqueness of successors) equivalent to $\forall n \forall k \cdot s(n, k) \rightarrow \phi(f(n), f(k))$ under the interpretation of infinite sequences. An analogous translation is simple for finite sequences: an additional unary relation symbol #denoting the last position in the sequence may appear in the guard. Similarly for both finite and infinite sequences, constant positions may be used. An example of using constant positions and end of sequence are: $\forall n \forall k. (s(5, n) \wedge s(12, k) \wedge \#(k)) \rightarrow \phi(f(n), f(k))$.

18—The Language GSSOTC

GSSOTC provides quantification over functions. First consider the more intuitive case of modelling a program that, at each point of time, reads an input and modifies its internal state as a function of the input and the previous state. This can be modelled as $\phi(x_{n-1}, x_n, y_n)$, where $x_{n-1}$ is the previous state, $x_n$ is the current state, and $y_n$ is the current input. An important question to ask is whether for each input there exists a corresponding output state. In the spirit of GS, this can be written as $\forall f \exists g \forall nk \cdot s(n, k) \rightarrow \phi(g(k), g(n), f(n))$, where f is a function from the natural numbers that returns the current input, and g returns the current state (or output). The semantics of the second order quantification $\forall f \exists g$ is not standard. It reads "for all (i.e., each) f there exists a time-compatible g." Intuitively, it means that the current state may not depend on future inputs. Formally, it is defined as follows: any instance of "$\forall \exists$" can be written as an instance of "$\exists \forall$," where the existential quantifier is of a higher order (in the spirit of Skolemization). In this case, it is possible to write $\forall f \exists g$ as $\exists G \forall f$, where G is a function from functions to functions, and the above formula can be written as $\exists_{tc} G \forall f \forall nk \cdot s (n, k) \rightarrow \phi((G(f))(k), G(f))(n), f(n))$. There is a restriction on G to be time-compatible, denoted by $\exists_{tc}$. This means that whenever $f_1$ and $f_2$ share a common prefix of length n, the functions $G(f_1)$ and $G(f_2)$ share a common prefix of length n.

This can be enhanced with many input and output functions, and further arbitrary quantifier alternation, allowing the expression of richer statements (e.g., of the form "for each keyboard input, there exists a memory state, such that for all network input, . . . ". One way to give meaning to this is to note that if $x_n$ is the input at step n and $y_n$ is the output, consider an infinite formula of the form $\forall x_1 \exists y_1 \forall x_2 \exists y_2 \forall x_3 \exists y_3 \ldots$ where the infinite alternation is due to the time compatibility condition. Richer quantifier alternation is now straight forward. For all keyboard input at time n, there exists a memory state at time n, such that for all network input at time n (and so on) is of the form $\forall x_1 \exists y_1 \forall z_1 \forall x_2 \exists y_2 \forall z_2 \forall x_3 \exists y_3 \forall z_3 \ldots$.

19—Method for Eliminating Function Quantifiers

Now consider an algorithm taking a formula in GSSOTC [L] and using algorithms in L[RR] (the language L enhanced with recurrence relations and potentially additional extensions, as described above) to determine whether there exists some natural number N such that for all K≥N there is a sequence of length K satisfying the original formula. In particular, this will guarantee the existence of an infinite sequence (or functions between sequences, such as from inputs to outputs in a time compatible fashion). Such L[RR] algorithms can be used when the language L is weakly ω-categorical.

A formula in GSSOTC[L] is a prefix of time-compatible function quantifiers, followed by a matrix. For simplicity (and without loss of generality), the matrix is assumed to be in disjunctive normal form (DNF). Its general form is therefore $Q_1 f_1 \ldots Q_k f_k \cdot \bigvee_i \bigwedge_j l_{ij}$ where each literal $l_{ij}$ is either of the form $\forall t_1, \ldots, t_n \cdot \gamma_{ij} \rightarrow \phi_{ij}$ or of the form $\exists t_1, \ldots, t_n \cdot \gamma_{ij} \wedge \phi_{ij}$. In addition, each Q is either "$\forall$" or "$\exists$", each $\gamma_{ij}$ is a conjunction of atoms over s, $\#$ in a way that uniquely determines the relative positions as above, and $\phi_{ij}$ is any formula in the language L. Each formula may depend on unary functions $f_1, \ldots, f_k$ applied to $t_1, \ldots, t_n$. Each function is therefore of type N→D. Note that the function quantifiers must appear as the outermost quantifiers. The universal case is treated here, and the existential case follows from the next section.

The method here decides satisfiability of $Q_1 f_1 \ldots Q_k f_k \cdot \bigvee_i \bigwedge_j l_{ij}$ by producing an equisatisfiable formula in L[RR]. The method produces a recurrence relation indexed by n that expresses "there exists a string of length n satisfying the formula" and has free variables denoting the first elements of the sequence (those are to be quantified later on in order to get a final answer). It is a recurrence relation because existence of string of length n can be expressed recursively from a formula expressing the existence of a string of length n−1, and this observation is the key. In the simplest case it may take the form $\phi_n(x) := \exists y. \phi(x, y) \wedge \phi_{n-1}(y)$ among other possible forms. If L is weakly ω-categorical, then essentially by definition it is possible to obtain L[RR] formulas that are equivalent to L formulas.

When constant positions appear in a formula, such as s (5, n), the number of free variables in $\phi_n$ cannot be smaller than the largest constant, because those free variables denote the beginning of the sequence. Enforcing the conditions on the beginning of the sequence from the original formula is then achieved by joining the $\phi_n$ with those conditions and then quantifying the free variables. This should happen for each n in the looping sequence of formulas. In particular, because of the weakly ω-categorical assumption, there exist positive integers N and K for which $\phi_N = \phi_{N+K}$ and therefore those initial conditions should be verified for $\phi_N, \phi_{N+1}, \ldots, \phi_{N+K}$ separately.

Formulas may be interpreted as speaking about finite strings or about infinite strings. If the symbol ∳ is not used, then an infinite string exists iff there exists a finite string of any large enough length. This is straightforward to check given the method here. If the symbol ∳ is used, then it is possible to check whether the formula requires that strings must be finite. Specifically, it is possible to check whether a formula entails the formula $\exists n \forall k \cdot s\ (n, k) \to \bot$ because the methods here (including in the section below) can be used to determine logical consequence. Moreover, it is possible to join the original formula with the negation of the latter formula, enforcing infinite strings only.

20—Boolean Combination of Sets of Models

Given two formulas of the form $\exists f \forall nk \cdot s(n, k) \to \phi(f(n), f(k))$ and $\exists f \forall nk \cdot s(n, k) \to \psi(f(n), f(k))$, their disjunction is simply $$\exists f(\forall nk \cdot s(n,k) \to \phi(f(n),f(k)) \vee \forall nk \cdot s(n,k) \to \psi(f(n),f(k)))$$

The disjunction is not $\exists f \forall nk \cdot s(n, k) \to [\phi(f(n), f(k)) \vee \psi(f(n), f(k))]$. This latter formula expresses a condition of the form "the exists a string such that in any position, either $\phi$ holds or $\psi$ holds." However, sometimes it is useful to express a Boolean combination of sets of models (strings) like the former formula, and ask whether this Boolean combination is empty. Intersection happens to correspond to conjunction of formulas, but this is not the case for negation and disjunction.

Deciding whether a Boolean combination of sets of models (each expressed as a formula) is empty can be done as follows. Assume the formula is given in DNF. Then intersection of positive literals collapses into a single one (i.e., one expressed by a single formula). Determining emptiness of this DNF can be achieved by checking whether each single DNF clause is empty. It is therefore sufficient to decide emptiness of a combination of the form $\{\phi\} \cap \cap_{n=1}^{N} \{\psi_i\}^C$, where $\{\cdot\}$ interprets a formula as a set of models. This too is done by conversion to L[RR]. Define $\eta_n^s$ for each $S \subseteq \{1, \ldots, N\}$ as a recurrence relation indexed by n, which expresses "there exists a string of length n such that $\phi$ holds in each position, and for all i, $\psi_i$ fails in some position if $i \in S$". In some embodiments, the free variables in $\eta_n^s$ are the values at the initial positions (all in the above fashion), and possibly N more variables that are constrained. The potential additional variables must be either 0 or 1. The additional variables do not require $\eta_n^s$, only $\eta_n$, because those variables encode S. Emptiness is then decided by examining satisfiability of $\eta_n^{\{1, \ldots, N\}}$. In its simplest form and in case of function symbols having one input and one output as well as lookback having a single input and single output, η looks like $$\eta_n^s(x, y) =$$

$$\forall x' \exists y'. \phi(x, y, x', y') \wedge \bigvee_{A \in 2^S} \left[ \eta_{n-1}^{S \setminus A}(x', y') \wedge \bigwedge_{i \in A} \neg \psi_i(x, y, x', y') \right]$$

where the $\bigwedge_{i \in A} \neg \psi_i(x, y, x', y')$ part says that the relevant ψ's fail at the initial position, and the part $\eta_{n-1}^{S \setminus A}(x', y')$ says that they fail in some other position.

21—Revision and Forcing

Consider the following example: a program gathers knowledge from a user (as inputs), and adds it to some internal knowledgebase. Sometimes the user might input a piece of knowledge that is inconsistent with previous knowledge. But in GSSOTC, the lookback is bounded, so there's no way to express looking back at all past inputs and make a decision based on them. A remedy for this is introduced by extending the language with what may be called a "forcing operator".

First, consider a program that adds knowledge to a knowledgebase:

$$\phi(x_{n-1}, x_n, y_n) := (x_n = (x_{n-1} \wedge y_n))$$

where $x_n$ is the current knowledgebase, $x_{n-1}$ is the previous knowledgebase, and $y_n$ is the current input. The goal is to force the knowledgebase to always be consistent, which can be written as:

$$\phi(x_{n-1}, x_n, y_n) := (x_n = (x_{n-1} \wedge y_n)) \wedge F(x_n \neq 0)$$

using a forcing operator F. This means that at execution time, an extra-logical engine will be invoked (when necessary to satisfy the forcing condition) to perform some arbitrary operation (e.g., displaying to the user all previous inputs and ask the user to edit them so that the condition $x_n \neq 0$ is satisfied). In the consistency check of this GSSOTC formula, it is assumed that $x_n \neq 0$, relying on the extra-logical operation (whatever it may be) to force this condition to hold.

In a more general sense, a formula containing the forcing operator F such as $$\phi(x_{n-1}, x_n, y_n) = \psi(x_{n-1}, x_n, y_n) \wedge F(\chi(x_{n-1}, x_n, y_n))$$

is checked for consistency by reducing it to checking consistency of $$\forall y_n \exists x_n \cdot \chi(x_{n-1}, x_n, y_n) \to \psi(x_{n-1}, x_n, y_n)$$

$$\exists y_n \exists x_n \cdot \psi(x_{n-1}, x_n, y_n) \wedge \chi(x_{n-1}, x_n, y_n)$$

22—Embedded Execution

In combination with the teaching of NSO above, GSSOTC may take as inputs and outputs sentences in GSSOTC itself. Sometimes it is useful to take a GSSOTC program as an input and execute it. This can be expressed in the form $\phi(x_n) := E(x_n)$, which means "execute the input $x_n$."

However execution itself is clearly not expressible in GSSOTC and needs to be an extra-logical operation. Therefore, assume that E returns either 0 or 1, depending on whether the execution was successful. Note that $x_n$ might look back at the states already computed by $\phi$, so consistency is relative to the history of the higher-level program $\phi$, its inputs, and states. The consistency check is now straightforward: simply rewrite the formula such that the return value of E is either 0 or 1, and check for consistency as usual. An extra-logical engine performs the execution and returns 0 or 1.

23—Example of a Software Specification Language

Consider the example given in the NSO discussion above (sections 11-13). It involves conditions of accepting a software update. However, the language in that case not only needs to support checks for updates, but also needs to be rich enough to serve a software specification language. A key point about being a software specification language is to be a so-called "temporal logic," being able to express things of the form "first do this, then do that." Further, inputs and outputs should be considered and distinguished from each other (which is not supported in many temporal logics). The temporal logic here allows describing processes (e.g. software) with inputs and outputs, and further verifying that for each input there exists a [time-compatible] output. Moreover, the temporal logic also supports a specification language that can deal with its own sentences because the temporal logic can easily be considered as an atomless Boolean algebra. Using the techniques in the NSO example allow checkable updates in a language rich enough to express software.

EXAMPLE EMBODIMENTS (A1) In some embodiments, a method is performed at a computing device having one or more processors and memory. The memory stores computer instructions configured for execution by the one or more processors. The method includes: (i) receiving user input to specify software requirements for a program, the software requirements expressed as a sentence $\varphi$ in a temporal formal language with guarded successors GSSOTC(L), wherein the sentence $\varphi$ includes temporal input variables; (ii) determining whether for each temporal input $y_n$ there is a corresponding output $x_n$ satisfying $\varphi(x_{n-1}, x_n, y_n)$, wherein $x_{n-1}$ is an output from a prior point in time; and (iii) in accordance with a determination that for each input $y_n$ there is a corresponding output $x_n$ satisfying $\varphi(x_{n-1}, x_n, y_n)$, executing an instance of a program that satisfies the software requirements.

(A2) In some embodiments of (A1), L is a base formal language, and GSSOTC(L) is an extension of L with guarded successors.

(A3) In some embodiments of (A1) or (A2), each input $y_n$ is a sentence in the formal language GSSOTC(L).

(A4) In some embodiments of any of (A1)-(A3), one or more input $y_n$ is a sentence in the base language L.

(A5) In some embodiments of any of (A1)-(A4), each output $x_n$ is a sentence in the formal language GSSOTC(L).

(A6) In some embodiments of any of (A1)-(A5), one or more output $x_n$ is a sentence in the base language L.

(A7) In some embodiments of any of (A1)-(A6), executing the instance of the program includes receiving inputs $y_1$, $y_2$, ..., $y_m$ from a user for some positive integer m.

(A8) In some embodiments of any of (A1)-(A7), executing the instance of the program includes displaying data on a display screen of the computing device, storing output data in the memory of the computing device, or transmitting output data to a remote device utilizing a network interface of the computing device.

(A9) In some embodiments of any of (A1)-(A8), each sentence in GSSOTC(L) comprises a prefix of time-compatible function quantifiers followed by a formal language matrix consisting of a quantifier-free formula.

(A10) In some embodiments of (A9), the method further comprises translating the sentence $\varphi$ into an equivalent sentence $\varphi'$ in GSSOTC(L) that is in disjunctive normal form.

(A11) In some embodiments of (A10), the equivalent sentence $\varphi'$ is of the form $Q_1 f_1 \ldots Q_k f_k \vee_i \wedge_j l_{ij}$, each function quantifier $Q_1, \ldots, Q_k$ is "∃" or "∀", each function $f_1, \ldots, f_k$ is a unary function whose domain is a contiguous set of positive integers specifying position, and each literal $l_{ij}$ is of the form $\forall t_1, \ldots, t_n. \gamma_{ij} \to \phi_{ij}$ or $\exists t_1, \ldots, t_n. \gamma_{ij} \wedge \phi_{ij}$.

(A12) In some embodiments of (A11), each formula $\gamma_{ij}$ is a conjunction of positive atomic formulas utilizing a successor predicate s( ) and/or a last position predicate #( ) the successor predicate s( ) is defined by s(a,b) iff a=b+1 and the last position predicate #( ) is defined by #(a) iff a is at a final position in sequence.

(A13) In some embodiments of (A12), for each formula $\gamma_{ij}$, the successor predicate s( ) utilized in the formula $\gamma_{ij}$ uniquely determine relative positions of the position indicators $t_1, \ldots, t_n$.

(A14) In some embodiments of (A11), each formula $\phi_{ij}$ is a formula, in the formal language L, that may depend on the unary functions $f_1, \ldots, f_k$ as applied to position identifiers $t_1, \ldots, t_n$.

(A15) In some embodiments of any of (A1)-(A14), determining whether for each temporal input $y_n$ there is a corresponding output $x_n$ satisfying $\varphi(x_{n-1}, x_n, y_n)$ comprises:
for the sentence $\varphi$, constructing an equisatisfiable formula $\varphi''$ in L[RR] consisting of recurrence relations in the formal language L; and
determining satisfiability of the equisatisfiable formula $\varphi''$.

(A16) In some embodiments of (A15), determining satisfiability of the equisatisfiable formula $\varphi''$ comprises unfolding the recurrence relations in the equisatisfiable formula $\varphi''$.

(A17) In some embodiments of (A16), unfolding the recurrence relations includes identifying a fixed point.

(A18) In some embodiments of any of (A1)-(A17), determining whether for each temporal input $y_n$ there is a corresponding output $x_n$ satisfying $\varphi(x_{n-1}, x_n, y_n)$ comprises:
for the sentence $\varphi$, constructing a set of recurrence relations in L[RR]; and
determining satisfiability of the sentence $\varphi$ according to the set of recurrence relations.

(A19) In some embodiments of any of (A1)-(A18), the sentence $\varphi$ includes a forcing function F applied to a condition $\chi(x_{n-1}, x_n, y_n)$, and F executes an extra-logical operation on the computing device to guarantee that the condition $\chi(x_{n-1}, x_n, y_n)$ holds.

(B1) In some embodiments, a method of validating software updates is performed by a software system installed on a computing device having one or more processors and memory storing one or more programs configured for execution by the one or more processors. The method comprises: (i) receiving a candidate software update for the software system, wherein both the software system and the candidate software update are expressed in an extended formal language that is an extension of one or more base formal languages, wherein sentences in each base formal language, up to logical equivalence, form elements in a Boolean Algebra, that has a falsity element 0 denoting falsity and that has a truth element 1 denoting truth, wherein the extended formal language includes the first-order theory of Boolean Algebras interpreted in the Boolean Algebra arising from each base formal language, extended to include a plurality of constant symbols each corresponding to a respective logical equivalence class of sentences in each base formal language, wherein the extended formal language and each base formal language, regarded as Boolean Algebras under logical equivalence, are elementarily equivalent under a signature of Boolean Algebra, wherein the candidate software update corresponds to an update sentence u in the extended formal language; (ii) for a condition element c, in the extended formal language, specifying a condition to validate the candidate software update, computing a truth value for uc'=0 in the extended formal language, wherein uc' is the logical conjunction of u with the logical negation of c; (iii) in accordance with a determination that uc'=0 is false, rejecting the candidate software update; and (iv) in accordance with a determination that uc'=0 is true, accepting the candidate software update, and installing the candidate software update on the computing device.

(B2) In some embodiments of (B1), the Boolean Algebra of each base formal language is atomless.

(B3) In some embodiments of (B1) or (B2), the Boolean Algebras of the extended formal language and each base formal language are isomorphic.

(B4) In some embodiments of any of (B1)-(B3), the condition c is a combination of different individual conditions each requiring to be satisfied for the candidate software update to be validated and accepted.

(B5) In some embodiments of any of (B1)-(B4), the candidate software update includes an update to the condition element c.

(B6) In some embodiments of (B5), if the candidate software update is accepted then the step of installing the candidate software update on the computing device comprises replacing the condition element c with an updated condition element d, in the extended formal language, specifying an updated condition to validate a subsequent candidate software update.

(B7) In some embodiments of (B6), the method further comprises: (i) receiving the subsequent candidate software update for the software system, wherein the subsequent candidate software update is expressed in the extended formal language; (ii) computing a truth value for ud'=0 in the extended formal language, wherein ud' is the logical conjunction of u with the logical negation of d; (iii) in accordance with a determination that ud'=0 is false, rejecting the subsequent candidate software update; and (iv) in accordance with a determination that ud'=0 is true, accepting the subsequent candidate software update, and installing the subsequent candidate software update on the computing device.

(B8) In some embodiments, a non-transitory, computer-readable storage medium stores instructions thereon that, when executed by one or more of the processors of the computing device, cause the one or more processors to execute the method of any of (B1)-(B7).

(C1) In some embodiments, a software system validates software updates to the software system, the software system being installed on a computing device having one or more processors and memory storing one or more programs configured for execution by the one or more processors. The software system is configured to: (i) receive a candidate software update for the software system, wherein both the software system and the candidate software update are expressed in an extended formal language that is an extension of one or more base formal languages, wherein sentences in each base formal language, up to logical equivalence, form elements in a Boolean Algebra, that has a falsity element 0 denoting falsity and that has a truth element 1 denoting truth, wherein the extended formal language includes the first-order theory of Boolean Algebras interpreted in the Boolean Algebra arising from each base formal language, extended to include a plurality of constant symbols each corresponding to a respective logical equivalence class of sentences in each base formal language, wherein the extended formal language and each base formal language, regarded as Boolean Algebras under logical equivalence, are elementarily equivalent under a signature of Boolean Algebra, wherein the candidate software update corresponds to an update sentence u in the extended formal language; (ii) for a condition element c, in the extended formal language, specifying a condition to validate the candidate software update, compute a truth value for uc'=0 in the extended formal language, wherein uc' is the logical conjunction of u with the logical negation of c; (iii) in accordance with a determination that uc'=0 is false, reject the candidate software update; and (i) in accordance with a determination that uc'=0 is true, accept the candidate software update, and install the candidate software update on the computing device.

(D1) In some embodiments, a method validates knowledge systems. The method is performed at a computing device having one or more processors and memory storing one or more programs configured for execution by the one or more processors. The method comprises: (i) storing a plurality of interrelated facts, represented by respective knowledge sentences, in a knowledge system, wherein the knowledge sentences are expressed in an extended formal language that is an extension of one or more base formal languages, wherein sentences in each base formal language, up to logical equivalence, form elements in a Boolean Algebra, that has a falsity element 0 denoting falsity and that has a truth element 1 denoting truth, wherein the extended formal language includes the first-order theory of Boolean Algebras interpreted in the Boolean Algebra arising from each base formal language, extended to include a plurality of constant symbols each corresponding to a respective logical equivalence class of sentences in each base formal language, wherein the extended formal language and each base formal language, regarded as Boolean Algebras under logical equivalence, are elementarily equivalent under a signature of Boolean Algebra; (ii) for each of a plurality of pairs of elements in the extended formal language, wherein each pair comprises a first element x representing a respective first knowledge sentence representing a first fact of the plurality of interrelated facts in the knowledge system and a second element y representing a respective second knowledge sentence representing a respective second fact of the plurality of interrelated facts in the knowledge system, evaluating the expression xy=0, wherein xy is the logical conjunction of x with y; and (iii) in accordance with a determination that there exists a pair of elements satisfying xy=0, determining that the knowledge system has stored facts that are inconsistent.

(E1) In some embodiments, a method of validating contract provisions is performed at a computing device having one or more processors and memory storing one or more programs configured for execution by the one or more processors. The method comprises: (i) receiving a contract, specified as a plurality of clauses represented by respective clause sentences, wherein the clause sentences are expressed in an extended formal language that is an extension of one or more base formal languages, wherein sentences in each base formal language, up to logical equivalence, form elements in a Boolean Algebra, that has a falsity element 0 denoting falsity and that has a truth element 1 denoting truth, wherein the extended formal language includes the first-order theory of Boolean Algebras interpreted in the Boolean Algebra arising from each base formal language, extended to include a plurality of constant symbols each corresponding to a respective logical equivalence class of sentences in each base formal language, wherein the extended formal language and each base formal language, regarded as Boolean Algebras under logical equivalence, are elementarily equivalent under a signature of Boolean Algebra; (ii) for each of a plurality of pairs of elements in the extended formal language, wherein each pair comprises a first element x representing a respective first clause sentence representing a first clause of the plurality of clauses in the contract and a second element y representing a respective second clause sentence representing a respective second clause of the plurality of clauses in the contract, evaluating the expression xy=0, wherein xy is the logical conjunction of x with y; and (iii) in accordance with a determination that there exists a pair of elements satisfying xy=0, determining that the contract has inconsistent provisions.

Many modifications may be made to the described examples without departing from the scope of the appended claims.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of symbolic artificial intelligence, performed at a computing device having one or more processors and memory storing one or more programs configured for execution by the one or more processors, the method comprising:
   identifying an atomless Boolean Algebra B and a first-order language (logic) of Boolean Algebras, the language having constant symbols 0, 1, and extended with a plurality of additional constant symbols, each constant symbol uniquely interpreted as a respective element of B;
   accessing an expression written in the extended first-order language, wherein the expression has one or more logical quantifiers and specifies whether to accept a software update on the computing device;
   selecting an innermost quantifier having a quantified variable x, and, when the innermost quantifier is not an existential quantifier, converting the expression so that the innermost quantifier is an existential quantifier;
   identifying a subexpression f, of the expression, to which the innermost quantifier applies;
   viewing the subexpression f as in disjunctive normal form having one or more DNF clauses $c_i$, $i \in I$, each DNF clause comprising a conjunction of one or more literals, each literal is either (a) a positive literal $p_{ij}(x)=0$, $j \in J_1$, or (b) a negative literal $n_{ij}(x) \neq 0$, $j \in J_2$;
   for each DNF clause $c_i$:
      forming a single substitute positive literal $p_i(x)=0$ by either (a) combining all positive literals $p_{ij}(x)=0$, $j \in J_1$, for the respective DNF clause into a single positive literal $\cup_{j \in J_1} p_{ij}(x)=0$ when there is at least one positive literal or (b) specifying the single substitute positive literal as 0=0 when there is not at least one positive literal;
      constructing a respective output clause of the form:

$$p_i(0)p_i(1) = 0 \wedge \bigwedge_{j \in J_2} (p_i'(0)n_{ij}(0) \cup p_i'(1)n_{ij}(1) \neq 0)$$

or $$p_i(0)p_i(1) = 0 \wedge \bigwedge_{j \in J_2} (n_{ij}(p_i(0)) \cup n_{ij}([p_i(1)]')) \neq 0$$

or $$p_i(0)p_i(1) = 0 \wedge \bigwedge_{j \in J_2} (n_{ij}(0)n_{ij}(1) = 0 \rightarrow [p_i(0)]'n_{ij}(0) + [p_i(1)]'n_{ij}(1) \neq 0);$$

constructing a modified expression by replacing the innermost quantifier and the subexpression f with a disjunction of the DNF output clauses, thereby eliminating the innermost quantifier; and
   computing a truth value t for the modified expression and, when t is true, installing the software update on the computing device.

2. The method of claim 1, wherein:
   when the modified expression contains one or more quantifiers, repeating the selecting, identifying, viewing, forming and constructing for each DNF clause, and constructing until the modified expression has no more remaining quantifiers, resulting in a final modified expression with no quantifiers; and
   providing the output on the computing device comprises showing the final modified expression with no quantifiers.

3. The method of claim 2, wherein the final modified expression is logically equivalent to the expression.

4. The method of claim 2, further comprising computing a truth value of the final modified expression and displaying the truth value of the final modified expression on a display of the computing device.

5. The method of claim 1, wherein the method comprises displaying data on a display screen of the computing device, storing output data in the memory of the computing device, and/or transmitting output data to a remote device utilizing a network interface of the computing device.

6. The method of claim 1, wherein the plurality of additional constant symbols comprises infinitely many symbols.

7. The method of claim 1, further comprising identifying a method of determining whether a Boolean combination of elements of B, corresponding to constant symbols of the language, results in 0.

8. The method of claim 1, wherein each of the one or more logical quantifiers is an existential quantifier or a universal quantifier.

9. The method of claim 8, including converting the expression when the selected innermost quantifier is a universal quantifier.

10. The method of claim 1, wherein each positive literal $p_{ij}(x)=0$ and each negative literal $n_{ij}(x)\neq 0$ comprises a first portion $p_{ij}(x)$ or $n_{ij}(x)$ that is a respective Boolean combination of (a) variables, (b) the constant symbols 0 and 1, and (c) the plurality of additional constant symbols.

11. The method of claim 1, wherein the disjunctive normal form for the subexpression f is:

$$\bigvee_{i\in I}\left(\bigwedge_{j\in J_1\cup J_2}[p_{ij}(x)=0]\wedge[n_{ij}(x)\neq 0]\right).$$

12. A computing device having one or more processors and memory storing one or more programs configured for execution by the one or more processors, the one or more programs comprising instructions for:

identifying an atomless Boolean Algebra B and a first-order language (logic) of Boolean Algebras, the language having constant symbols 0, 1, and extended with a plurality of additional constant symbols, each constant symbol uniquely interpreted as a respective element of B;

accessing an expression written in the extended first-order language, wherein the expression has one or more logical quantifiers and specifies whether to accept a software update on the computing device;

selecting an innermost quantifier having a quantified variable x, and, when the innermost quantifier is not an existential quantifier, converting the expression so that the innermost quantifier is an existential quantifier;

identifying a subexpression f, of the expression, to which the innermost quantifier applies;

viewing the subexpression f as in disjunctive normal form having one or more DNF clauses $c_i$, $i\in I$, each DNF clause comprising a conjunction of one or more literals, each literal is either (a) a positive literal $p_{ij}(x)=0$, $j\in J_1$, or (b) a negative literal $n_{ij}(x)\neq 0$, $j\in J_1$;

for each DNF clause $c_i$:

forming a single substitute positive literal $p_i(x)=0$ by either (a) combining all positive literals $p_{ij}(x)=0$, $j\in J_1$, for the respective DNF clause into a single positive literal $\cup_{j\in J_1}p_{ij}(x)=0$ when there is at least one positive literal or (b) specifying the single substitute positive literal as 0=0 when there is not at least one positive literal;

constructing a respective output clause of the form:

$$p_i(0)p_i(1)=0\wedge\bigwedge_{j\in J_2}(p_i'(0)n_{ij}(0)\cup p_i'(1)n_{ij}(1)\neq 0)$$

or $$p_i(0)p_i(1)=0\wedge\bigwedge_{j\in J_2}(n_{ij}(p_i(0))\cup n_{ij}([p_i(1)]'))\neq 0$$

or $$p_i(0)p_i(1)=0\wedge\bigwedge_{j\in J_2}(n_{ij}(0)n_{ij}(1)=0\to[p_i(0)]'n_{ij}(0)+[p_i(1)]'n_{ij}(1)\neq 0);$$

constructing a modified expression by replacing the innermost quantifier and the subexpression f with a disjunction of the DNF output clauses, thereby eliminating the innermost quantifier; and computing a truth value t for the modified expression and, when t is true, installing the software update on the computing device.

13. The computing device of claim 12, wherein:

when the modified expression contains one or more quantifiers, repeating the selecting, identifying, viewing, forming and constructing for each DNF clause, and constructing until the modified expression has no more remaining quantifiers, resulting in a final modified expression with no quantifiers; and providing the output on the computing device comprises showing the final modified expression with no quantifiers.

14. The computing device of claim 13, wherein the final modified expression is logically equivalent to the expression.

15. The computing device of claim 13, wherein the one or more programs further comprise instructions for computing a truth value of the final modified expression and displaying the truth value of the final modified expression on a display of the computing device.

16. The computing device of claim 12, wherein the one or more programs further comprise instructions for displaying data on a display screen of the computing device, storing output data in the memory of the computing device, and/or transmitting output data to a remote device utilizing a network interface of the computing device.

17. The computing device of claim 12, wherein the plurality of additional constant symbols comprises infinitely many symbols.

18. The computing device of claim 12, wherein each of the one or more logical quantifiers is an existential quantifier or a universal quantifier and the one or more programs comprise instructions for converting the expression when the selected innermost quantifier is a universal quantifier.

19. The computing device of claim 12, wherein each positive literal $p_{ij}(x)=0$ and each negative literal $n_{ij}(x)=0$ comprises a first portion $p_{ij}(x)$ or $n_{ij}(x)$ that is a respective Boolean combination of (a) variables, (b) the constant symbols 0 and 1, and (c) the plurality of additional constant symbols.

20. The computing device of claim 12, wherein the disjunctive normal form for the subexpression f is:

$$\bigvee_{i\in I}\left(\bigwedge_{j\in J_1\cup J_2}[p_{ij}(x)=0]\wedge[n_{ij}(x)\neq 0]\right).$$

* * * * *